(12) United States Patent
Hoelen et al.

(10) Patent No.: US 6,566,689 B2
(45) Date of Patent: May 20, 2003

(54) ILLUMINATION SYSTEM AND DISPLAY DEVICE

(75) Inventors: Christoph Gerard August Hoelen, Eindhoven (NL); Gerard Harbers, Best (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/139,180

(22) Filed: May 6, 2002

(65) Prior Publication Data

US 2002/0167016 A1 Nov. 14, 2002

(30) Foreign Application Priority Data

May 8, 2001 (EP) .............................. 01201667

(51) Int. Cl.[7] .............................. H01L 29/20; G01J 5/08
(52) U.S. Cl. .............................. 257/89; 257/79; 257/80; 257/81; 250/227.11

(58) Field of Search ................. 257/79–89; 250/227.11, 250/227.21, 216, 235, 239; 362/11, 16; 345/38, 39, 44, 46, 48, 84

(56) References Cited

U.S. PATENT DOCUMENTS

| 4,798,448 A | * | 1/1989 | van Raalte | ................... | 349/62 |
| 5,334,856 A | * | 8/1994 | Otsuka et al. | ................. | 257/40 |
| 5,828,471 A | * | 10/1998 | Davis et al. | ................... | 359/15 |

* cited by examiner

*Primary Examiner*—David Nelms
*Assistant Examiner*—Long Tran

(57) ABSTRACT

A backlight system for illuminating a display device comprises a light-emitting panel (1) having a front wall, an opposing rear wall and edge areas (4). At least one of the edge areas (4) is light-transmitting and associated with a light source. The light source associated with the light-transmitting edge areas (4) of the light-emitting panel (1) comprises symmetric clusters (C) of light-emitting diodes having three mutually different light emission wavelengths, for example symmetric clusters (C) of blue, green and red LEDs (6G, 6B, 6R, 6B', 6G'; 6G, 6B, 6R, 6B', 6G'; ...).

23 Claims, 13 Drawing Sheets

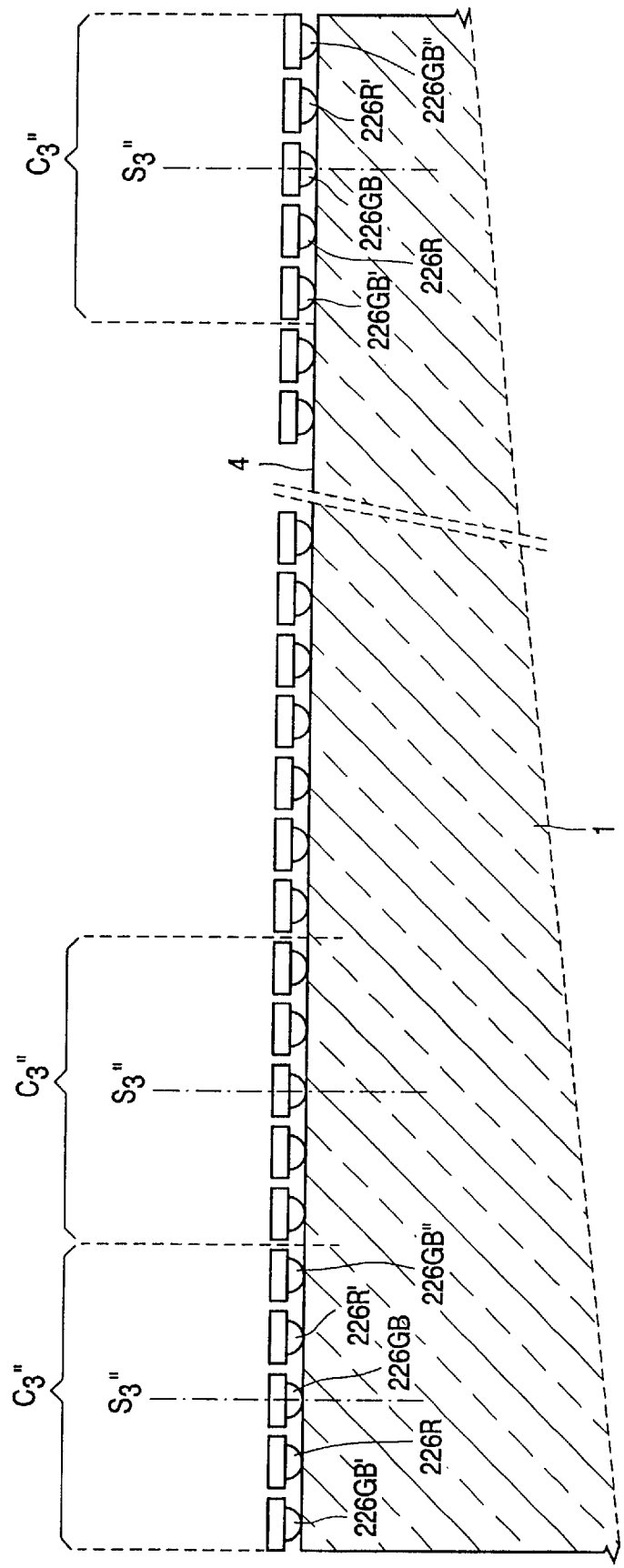

ILLUMINATION SYSTEM AND DISPLAY DEVICE

The invention relates to an illumination system for illuminating a display device, which illumination system is provided with a light-emitting panel comprising a front wall, a rear wall situated opposite said front wall, and edge areas between the front wall and the rear wall, at least one of the edge areas of the panel being light-transmitting, at least one light source being associated with the light-transmitting edge area, and in operation, light originating from the light source being incident on the light-transmitting edge area and spreading in the panel.

The invention also relates to a display device comprising said illumination system.

Such illumination systems are known per se and are alternatively referred to as edge lighting systems. They are used, inter alia, as a backlighting of (image) display devices, for example for television receivers and monitors. Such illumination systems can particularly suitably be used as backlights for non-emissive displays, such as liquid crystal display devices, also referred to as LCD panels, which are used in (portable) computers or (cordless) telephones.

Said display devices generally include a substrate provided with a regular pattern of pixels, which are each driven by at least one electrode. In order to reproduce an image or a datagraphic representation in a relevant area of a (display) screen of the (image) display device, the display device uses a control circuit. In an LCD device, the light originating from the backlight is modulated by means of a switch or a modulator, while applying various types of liquid crystal effects. In addition, the display may be based on electrophoretic or electromechanical effects.

In the illumination systems mentioned in the opening paragraph, customarily a tubular low-pressure mercury vapor discharge lamp, for example one or more cold cathode fluorescent lamps (CCFL) are used as the light source, the light which is emitted, in operation, by the light source being coupled into the light-emitting panel which serves as an optical waveguide. This optical waveguide generally forms a comparatively thin and flat panel which is made, for example, of a synthetic resin material or glass, light being transported through the optical waveguide under the influence of (total) internal reflection.

Such an illumination system may also be provided with an alternative light source in the form of a plurality of optoelectronic elements, also referred to as electro-optic elements, such as electroluminescent elements, for example light-emitting diodes (LEDs). These light sources are generally provided in the proximity of, or are contiguous with, a light-transmitting edge area of the light-emitting panel, so that, in operation, light originating from the light source is incident on the light-transmitting edge area and spreads in the panel.

WO-A 99 53 236 discloses an illumination system which causes an LCD panel to be illuminated at different types of ambient light. For the light source use is made of incandescent lamps which couple light into a light-emitting panel, also referred to as light pipe. In the light-emitting panel, multiple reflections of light bring about a light distribution to illuminate the LCD panel.

An illumination system of the above-mentioned type has the disadvantage that the light distribution in the light-emitting panel, particularly at the edges of the light-emitting panel, is insufficiently uniform. As a result, the illumination uniformity of the display device is insufficient.

It is an object of the invention to completely or partly overcome the above-mentioned drawback.

In accordance with the invention, this object is achieved in that the light source associated with the light-transmitting edge area of the light-emitting panel comprises clusters of at least three light-emitting diodes having a first, a second and a third light emission wavelength, which light emission wavelengths are different, an imaginary mirror surface, which relates to the cluster, being situated in the center of each cluster, the light-emitting diodes in the cluster being arranged in a direction perpendicular to the imaginary mirror surface, and the light-emitting diodes being distributed over the cluster in such a manner that the spectral emissions of the light emitted by the light-emitting diodes are mirror symmetrical with respect to the imaginary mirror surface.

The LEDs of different colors cause undesirable color effects near the edges of the light-emitting panel. In such illumination systems, generally, clusters of LEDs are applied in the ratio R (red):G (green):B (blue)=1:1:1 or R:G:B= 1:2:1, dependent upon the relative luminous flux emitted, in operation, by the LEDs. The use of a larger number of LEDs per cluster is possible, however, this has the disadvantage that homogeneously mixing the colors becomes gradually more difficult. In the case of a linear array of said LEDs, the pitch between the clusters of LEDs has a strong influence on the amount of space that is necessary before the light is sufficiently mixed to achieve the desired color uniformity. Given the above-mentioned known R:G:B ratios, the length necessary to sufficiently mix the light amounts to three to four times the pitch between the clusters of LEDs.

However, at said known ratios R:G:B=1:1:1 or 1:2:1, angular effects occur at the edges of the light-emitting panel. Particularly, undesirable color effects occur near the edges of the light-emitting panel, and the color point depends on the position on the light-emitting panel. The radiation pattern of the LEDs influences said angular effects.

The inventors have recognized that these angular effects are reduced substantially if the clusters of LEDs used are symmetrical as regards their light emission wavelength. The edge areas of the light-emitting panel, which extend transversely to the light-transmitting edge area, act as a (specular and/or diffuse) mirror for the light emitted by the LEDs. If the LEDs are arranged in the clusters in such a manner that they are symmetrical in terms of light emission wavelength, then the mirror effect of the edge areas of the light-emitting panel, which edge areas extend transversely to the light-transmitting edge area, is reduced substantially.

Arranging the LEDs in a cluster in such a manner that they are symmetrical in terms of light emission wavelength, implies that LEDs of the same light emission wavelength are situated on both sides of the imaginary mirror surface. If there is an odd number of LEDs per cluster, then the imaginary mirror surface intersects the middle LED in the cluster.

By virtue of the measure in accordance with the invention, the uniformity of the distribution of the light emitted by the illumination system is improved. As a result, a more uniform illumination of the (image) display device is obtained.

Preferably, the light source comprises symmetric clusters of blue, green and red light-emitting diodes. Blue, green and red are the primary colors used in (image) display devices. Preferably, LEDs are used having a high light output and a comparatively broad radiation pattern. Furthermore, in order to improve the mixing of light, preferably LEDs emitting light in pronounced lobes are used.

Preferably, each one of the light-emitting diodes has a luminous flux of at least 5 lm. LEDs having such a high output are alternatively referred to as LED power packages.

The smaller the number of LEDs per cluster, the more compact the illumination system can be designed.

A preferred embodiment of the illumination system is characterized in that each one of the clusters comprises five light-emitting diodes, one light-emitting diode having the first light emission wavelength being situated in the center of the cluster, said light-emitting diode being arranged between two light-emitting diodes having the second light emission wavelength, and each of said two light-emitting diodes being flanked, on the side facing away from the center of the cluster, by a light-emitting diode having the third light emission wavelength.

It is particularly preferred to employ an illumination system comprising five LEDs per cluster, wherein the ratio R:G:B=1:2:2, R:G:B=2:1:2 or R:G:B=2:2:1. By way of example, the clusters mentioned herein comprise, successively, GBRBG, RGBGR or RBGBR LEDs. Clusters having such R:G:B ratios are favorable because the number of LEDs per cluster is comparatively small and variations in the output of the LED can be readily compensated for. This has the additional advantage that a slightly larger distance between the LEDs can be chosen.

An alternative embodiment of the illumination system is characterized in that each one of the clusters comprises six light-emitting diodes, two light-emitting diodes having the first light emission wavelength being situated in the center of the cluster, said two light-emitting diodes being arranged between two light-emitting diodes having the second light emission wavelength, and the latter two light-emitting diodes each being flanked, on the side facing away from the center of the cluster, by a light-emitting diode having the third light emission wavelength.

It is particularly preferred to employ an illumination system comprising six LEDs per cluster, wherein the ratio R:G:B is 2:2:2, for example clusters comprising successively GBRRBG, RGBBGR or BRGGRB LEDs.

A further alternative embodiment of the illumination system is characterized in that each one of the clusters comprises seven light-emitting diodes, one light-emitting diode having the first light emission wavelength being situated in the center of the cluster, said light-emitting diode being arranged between two light-emitting diodes having the second light emission wavelength, said two light-emitting diodes each being flanked, on the side facing away from the center of the cluster, by a light-emitting diode having the third light emission wavelength, and the latter light-emitting diodes each being flanked, on the side facing away from the center of the cluster, by a light-emitting diode having the first light emission wavelength.

It is particularly preferred to employ an illumination system comprising seven LEDs per cluster, wherein the ratio R:G:B=2:2:3, R:G:B=2:3:2 or R:G:B=3:2:2. By way of example, the clusters mentioned here successively comprise GBRGRBG, RGBRBGR or BGRBRGB LEDs.

If a still larger number of LEDs per cluster is chosen, it is possible that a periodic pattern of colors forms at the edge of the illumination system as a result of the fact that the colors do not mix very well. Such periodicity generally corresponds to the pitch between the clusters.

In general, each cluster comprises an integral number of LEDs. In general, if each cluster comprises an even number of LEDs, the imaginary mirror surface is situated between two LEDs. Conversely, if each cluster comprises an odd number of LEDs, the imaginary mirror surface is situated, in general, in the center of one LED, i.e. the imaginary mirror surface "intersects" the middle LED of the cluster. Correspondingly, it can be imagined that an imaginary interface extends between two clusters of LEDs. In general, such an imaginary interface extends between two LEDs, one of said LEDs forming part of one cluster and the other LED forming part of the other, neighboring cluster. In an alternative embodiment of the illumination system, the imaginary interface between two clusters of LEDs is situated in the middle of one LED, i.e. the imaginary interface of two clusters intersects said LED. Consequently, one half of said LED forms part of one cluster of LEDs and the other half of said LED forms part of the other, neighboring cluster of LEDs. As one LED is shared by two clusters, the number of LEDs can be reduced while the symmetry of the clusters is preserved.

An important aspect in the case of clusters of LEDs which share a LED at their interface is that the LED situated at the edge of the light-emitting panel only half contributes to the generation of light in the light-emitting panel. This can be attributed to the fact that, in principle, only one half of this LED forms part of its cluster, but said LED is not shared with another cluster, as in the case of the other clusters. This 50% contribution to the light generation in the light-emitting panel is achieved in a simple manner by screening one half of the LED situated at the edge of the light-emitting panel, or by supplying such a current to this LED that the light output of said LED is only 50% of the normal light output.

Thus, a preferred embodiment of the illumination system is characterized in that each of the clusters comprises four light-emitting diodes, and two neighboring clusters of LEDs share one LED, one light-emitting diode having the first light emission wavelength being situated in the middle of the cluster, said light-emitting diode being arranged between two light-emitting diodes having the second light emission wavelength, and said light-emitting diodes each being flanked, on the side facing away from the middle of the cluster, by a light-emitting diode having the third light emission wavelength, one half of the light-emitting diode having the third light emission wavelength forming part of the neighboring cluster of LEDs.

It is particularly preferred to employ an illumination system comprising four LEDs per cluster, wherein the ratio R:G:B=1:1:2, R:G:B=1:2:1 or R:G:B=2:1:1. By way of example, the clusters mentioned here successively comprise GBRBG, GRBRG, RGBGR, RBGBR, BGRBG or BRGRB LEDs. In all these examples, the first-mentioned and the last-mentioned LED form part of the neighboring cluster, the LEDs situated nearest to the edge of the light-emitting panel only half contributing to the relevant cluster in the manner described hereinabove. Clusters with such R:G:B ratios are favorable because the number of LEDs per cluster is comparatively small and variations in the output of the LED can be readily compensated for. This has the additional advantage that a slightly larger distance between the LEDs can be chosen.

Correspondingly, an alternative embodiment of the illumination system is characterized in that each of the clusters comprises five light-emitting diodes, and two neighboring clusters of LEDs share one LED, two light-emitting diodes having the first light emission wavelength being situated in the middle of the cluster, said light-emitting diodes being arranged between two light-emitting diodes having the second light emission wavelength, and the latter light-emitting diodes each being flanked, on the side facing away from the middle of the cluster, by a light-emitting diode having the third light emission wavelength, one half of the light-emitting diode having the third light emission wavelength forming part of the neighboring cluster of LEDs.

It is particularly preferred to employ an illumination system comprising five LEDs per cluster, wherein the ratio R:G:B=1:2:2, R:G:B=2:2:1 or R:G:B=2:1:2. By way of example, the clusters mentioned here successively comprise RBGGBR, GRBBRG or BGRRGB LEDs. In all these examples, the first-mentioned and the last-mentioned LED form part of the neighboring cluster, the LEDs situated closest to the edge of the light-emitting panel only half contributing to the relevant cluster in the manner described hereinabove.

Correspondingly, a further alternative embodiment of the illumination system comprises six LEDs per cluster, the ratios of the LEDs being R:G:B=1:2:3, R:G:B=2:3:1 or R:G:B 3:2:1, or the ratio of the LEDs being R:G:B=1:1:4, R:G:B=1:4:1 or R:G:B=4:1:1. By way of example of the former ratio, the clusters mentioned here successively comprise RGBGBGR or RBGGGBR LEDs. By way of example of the latter ratio, the clusters mentioned here successively comprise RGGBGGR LEDs. In all these examples, the first and the last LED form part of the neighboring cluster, the LEDs situated closest to the edge of the light-emitting panel only half contributing to the relevant cluster in the manner described hereinabove.

In an interesting, alternative embodiment of the illumination system, use is made of LEDs having a combination of two light emission wavelengths. This is achieved, for example, by partly providing the blue LEDs with a green phosphor, or by partly providing green LEDs with a red phosphor, or by partly providing blue LEDs with a red phosphor. In this manner, the symmetric clusters of LEDs can be formed using fewer LEDs.

To achieve this, an embodiment of the illumination system is characterized in that the light source associated with the light-transmitting edge area of the light-emitting panel comprises clusters of at least one light-emitting diode having a first light emission wavelength and at least one light-emitting diode having a combination of a second and a third light emission wavelength, which light emission wavelengths are different, an imaginary mirror surface that relates to the cluster being situated in the middle of each cluster, the light-emitting diodes in the cluster being arranged in a direction perpendicular to the imaginary mirror surface, and the light-emitting diodes being distributed over the cluster in such a manner that the spectral emissions of the light emitted by the light-emitting diodes are mirror symmetrical with respect to the imaginary mirror surface.

In said embodiment of the illumination system, preferably, each one of the clusters comprises three light-emitting diodes, one light-emitting diode having the first light emission wavelength being situated in the middle of the cluster, said light-emitting diode being arranged between two light-emitting diodes having the combination of the second and the third light emission wavelength.

In an alternative embodiment, one light-emitting diode having the second and the third light emission wavelength is situated in the middle of the cluster and is flanked, on each side, by a light-emitting diode having the first light emission wavelength.

Using three LEDs per cluster, a particularly compact illumination system having symmetric clusters of LEDs is obtained.

In said embodiment of the illumination system, preferably, each one of the clusters comprises four light-emitting diodes, two light-emitting diodes having the combination of the first and the second light emission wavelength being situated in the middle of the cluster, said light-emitting diodes being arranged between two light-emitting diodes having the first light emission wavelength.

In an alternative embodiment, two light-emitting diodes having the third light emission wavelength are situated in the middle of the cluster and are flanked, on each side, by a light-emitting diode having the combination of the first and the second light emission wavelength.

Using four LEDs per cluster, a very compact illumination system having symmetric clusters of LEDs is obtained.

In said embodiment of the illumination system, preferably, each one of the clusters comprises five light-emitting diodes, one light-emitting diode having the combination of the first and the second light emission wavelength being situated in the middle of the cluster, said light-emitting diode being arranged between two light-emitting diodes having the third light emission wavelength, and said two light-emitting diodes each being flanked, on the side facing away from the middle of the cluster, by a light-emitting diode having the combination of the first and the second light emission wavelength.

In an alternative embodiment, a light-emitting diode having the third light emission wavelength is arranged in the middle of the cluster between two light-emitting diodes having the combination of the first and the second light emission wavelength, said two light-emitting diodes each being flanked, on the side facing away from the middle of the cluster, by a light-emitting diode having the first light emission wavelength.

Using five LEDs per cluster, a compact illumination system having symmetric clusters of LEDs is obtained.

In the above-mentioned, alternative embodiment of the illumination system, wherein the imaginary interface between two clusters of LEDs is situated in the middle of one LED, it is possible to further reduce the number of LEDs per cluster.

Thus, a preferred embodiment of the illumination system is characterized in that each of the clusters comprises two light-emitting diodes, and two neighboring clusters of LEDs share one LED, one light-emitting diode having the first light emission wavelength being situated in the middle of the cluster, said light-emitting diode being arranged between two light-emitting diodes having the combination of the second and the third light emission wavelength, one half of the light-emitting diode having the combination of the second and the third light emission wavelength forming part of the neighboring cluster of LEDs. In the opposite case, one light-emitting diode having the combination of the second and the third light emission wavelength is situated in the middle of the cluster, said light-emitting diode being arranged between two light-emitting diodes having the first light emission wavelength. In the latter case, (one half of) the light-emitting diodes having the first light emission wavelength form part of the neighboring clusters.

Correspondingly, an alternative embodiment of the illumination system is characterized in that each one of the clusters comprises three light-emitting diodes, and two neighboring clusters of LEDs share one LED, two light-emitting diodes having the first light emission wavelength being situated in the middle of the cluster, said two light-emitting diodes being arranged between two light-emitting diodes having the combination of the second and the third light emission wavelength, one half of the light-emitting diode having the combination of the second and the third light emission wavelength forming part of the neighboring cluster of LEDs. In the opposite case, two light-emitting diodes having the combination of the second and the third light emission wavelength are situated in the middle of the cluster, said two light-emitting diodes being arranged between two light-emitting diodes having the first light emission wavelength. In the latter case, (one half of) the two light-emitting diodes having the first light emission wavelength form part of the neighboring clusters.

Correspondingly, a further alternative embodiment of the illumination system is characterized in that each one of the clusters comprises four light-emitting diodes, and two neighboring clusters of LEDs share one LED, three light-emitting diodes having the first light emission wavelength being situated in the middle of the cluster, said three light-emitting diodes being arranged between two light-emitting diodes having the combination of the second and the third light emission wavelength, one half of the light-emitting diode having the combination of the second and the third light emission wavelength forming part of the neighboring cluster of LEDs. In the opposite case, three light-emitting diodes having the combination of the second and the third light emission wavelength are situated in the middle of the cluster, said three light-emitting diodes being arranged between two light-emitting diodes having the first light emission wavelength. In the latter case, (one half of) the two light-emitting diodes having the first light emission wavelength form part of the neighboring clusters.

The object in accordance with the invention is alternatively achieved in that the illumination system comprises a first light-emitting panel and a second light-emitting panel, said first and second light-emitting panels being arranged at least substantially parallel to each other, the light source associated with the light-transmitting edge area of the first light-emitting panel comprises a plurality of light-emitting diodes having a first light emission wavelength, and the light source associated with the light-transmitting edge area of the second light-emitting panel comprises clusters of at least two light-emitting diodes having a second and a third light emission wavelength, an imaginary mirror surface that relates to the cluster being situated in the middle of each cluster, the light-emitting diodes in the cluster being arranged in a direction perpendicular to the imaginary mirror surface, the light-emitting diodes being distributed over the cluster in such a manner that the spectral emissions of the light emitted by the light-emitting diodes are mirror symmetrical with respect to the imaginary mirror surface, and the first, the second and the third light emission wavelength being different.

The advantage of applying more than one light-emitting panel in the illumination system is that the light-transmitting edge areas of the first light-emitting panel are associated with (at the most) two LEDs having different light emission wavelengths, and that the light-transmitting edge areas of the second light-emitting panel are associated with one or (at the most) two LEDs. If three LEDs of different colors are associated with the light-transmitting edge area of a light-emitting panel, comparatively much more space is necessary to sufficiently mix the light originating from the LEDs. By coupling light originating from maximally two types of LEDs into one light-emitting panel, and by coupling light originating from maximally two types of LEDs into the other light-emitting panel, the space necessary to mix light is reduced substantially.

A further advantage of the use of multiple light panels is that the light output and the light distribution of each of the panels can be individually influenced.

The light source associated with the light-transmitting edge area of the first light-emitting panel preferably comprises a plurality of green light-emitting diodes, and the light source associated with the light-transmitting edge area of the second light-emitting panel preferably comprises symmetric clusters of blue and red light-emitting diodes.

A preferred embodiment of the illumination system is characterized in that each one of the clusters comprises three light-emitting diodes, one light-emitting diode having the second light emission wavelength being situated in the middle of the cluster, said light-emitting diode being arranged between two light-emitting diodes having the third light emission wavelength.

It is particularly preferred to employ an illumination system comprising three LEDs per cluster, wherein the ratio between the numbers of LEDs associated with the light-transmitting edge area of the second light-emitting panel is 1:2. If, by way of example, only G LEDs are associated with the light-transmitting edge area of the first light-emitting panel, then clusters of successively BRB or RBR are associated with the ligh-transmitting edge area of the second light-emitting panel.

In the above-mentioned alternative embodiment of the illumination system, wherein the imaginary interface between two clusters of LEDs is situated in the middle of one LED, the number of LEDs per cluster can be further reduced.

Thus, a preferred embodiment of the illumination system is characterized in that each one of the clusters comprises two light-emitting diodes, and two neighboring clusters of LEDs share one LED, one light-emitting diode having the second light emission wavelength being situated in the middle of the cluster, said light-emitting diode being arranged between two light-emitting diodes having the third light emission wavelength, one half of the light-emitting diode having the third light emission wavelength forming part of the neighboring cluster of LEDs. In the opposite case, one light-emitting diode having the third light emission wavelength is situated in the middle of the cluster, said light-emitting diode being arranged between two light-emitting diodes having the second light emission wavelength. In the latter case, (one half of) the light-emitting diodes having the second light emission wavelength form part of the neighboring clusters.

In an alternative embodiment, both the first and the second light-emitting panel are provided with clusters of three LEDs. By way of example, clusters of successively GBG LEDs are associated with the first light-emitting panel, and clusters of successively RGR LEDs are associated with the second light-emitting panel. In this manner, a ratio of 1:2:3 between the total number of LEDs can be achieved. In a further example, clusters of successively GBG LEDs are associated with the first light-emitting panel, and clusters of successively RBR LEDs are associated with the second light-emitting panel. In this manner, a ratio of 1:1:1 between the total number of LEDs can be achieved.

An alternative embodiment of the illumination system is characterized in that each one of the clusters comprises four light-emitting diodes, two light-emitting diodes having the second light emission wavelength being situated in the middle of the cluster, said light-emitting diodes being arranged between two light-emitting diodes having the third light emission wavelength.

It is particularly preferred to employ an illumination system comprising four LEDs per cluster, wherein the ratio between the numbers of LEDs associated with the light-transmitting edge area of the second light-emitting panel is 2:2. If, by way of example, only G LEDs are associated with the light-transmitting edge area of the first light-emitting panel, then clusters of successively BRRB or RBBR are associated with the light-transmitting edge area of the second light-emitting panel.

A further alternative embodiment of the illumination system is characterized in that each one of the clusters comprises five light-emitting diodes, one light-emitting diode having the third light emission wavelength being situated in the middle of the cluster, said light-emitting diode being arranged between two light-emitting diodes having the second light emission wavelength, and said two light-emitting diodes each being flanked, on the side facing away from the middle of the cluster, by a light-emitting diode having the third light emission wavelength.

It is particularly preferred to employ an illumination system comprising five LEDs per cluster, wherein the ratio between the numbers of LEDs associated with the light-transmitting edge area of the second light-emitting panel is 2:3. If, by way of example, only G LEDs are associated with the light-transmitting edge area of the first light-emitting panel, then clusters of successively BRBRB or RBRBR are associated with the light-transmitting edge area of the second light-emitting panel.

A further alternative embodiment of the illumination system is characterized in that each one of the clusters comprises five light-emitting diodes, one light-emitting diode having the second light emission wavelength being situated in the middle of the cluster, said light-emitting diode being arranged between two light-emitting diodes having the third light emission wavelength, and said two light-emitting diodes each being flanked, on the side facing away from the middle of the cluster, by a light-emitting diode having the third light emission wavelength.

It is particularly preferred to employ an illumination system comprising five LEDs per cluster, wherein the ratio between the numbers of LEDs associated with the light-transmitting edge area of the second light-emitting panel is 1:4. If, by way of example, only G LEDs are associated with the light-transmitting edge area of the first light-emitting panel, then clusters of successively BBRBB or RRBRR are associated with the light-transmitting edge area of the second light-emitting panel.

In alternative embodiments of the illumination system, the colors associated with the light-emitting panels are interchanged.

The amount of light emitted by the LEDs is regulated by varying the luminous flux of the light-emitting diodes. Regulating the luminous flux generally takes place in an energy-efficient manner. For example, LEDs can be dimmed without a noticeable decrease in efficiency. Preferably, the intensity of the light emitted by the light-emitting diodes is variable in response to the illumination level of an image to be displayed by the display device, or in response to the level of the ambient light. Preferably, the color point of an image displayed by the display device is determined by the illumination system. By virtue thereof, a(n) (improved) dynamic range (for example contrast) of the image to be displayed by the display device is obtained.

By virtue of the measure in accordance with the invention, the light emitted by the illumination system is more uniformly distributed. As a result, a more uniform illumination of the (image) display device is obtained. In addition, an illumination system in accordance with the invention enables a (laterally) more compact illumination system having the same light uniformity to be obtained.

In further alternative embodiments of the illumination system, apart from LEDs having a specific light emission wavelength, LEDs are used which are provided with a phosphor, as a result of which the light emission of the light emitted by the LED is converted by said phosphor to light having a different, desired light emission wavelength. A combination of red LEDs and phosphor LEDs can particularly suitably be used to produce the other colors.

Preferably, each one of the light-emitting diodes has a luminous flux of at least 5 lm. LEDs having such a high output are also referred to as LED power packages. The use of these high-efficiency, high-output LEDs has the specific advantage that, at a desired, comparatively high light output, the number of LEDs may be comparatively small. This has a positive effect on the compactness and the efficiency of the illumination system to be manufactured.

The use of LEDs has the further advantage that dynamic illumination possibilities are obtained. For this purpose, a sensor for measuring the optical properties of the light emitted, in operation, by the light source is preferably situated at a light-transmitting edge area. If different types of LEDs are combined and/or LEDs of different colors are employed, it is possible to mix colors in a desirable manner, for example, to enable the illumination system to emit white light of the desired color temperature. In addition, color changes can be brought about irrespective of the condition of the display device.

In order to save space, the light panels are preferably arranged one behind the other. The front wall or, preferably, the rear wall of the light-emitting panels is provided with means for coupling light out of the panel. These means for coupling out light are alternatively referred to as coupling-out members. These means, which are known per se, comprise (patterns of) deformations. Said means couple light out of the light-emitting panels by reflection, scattering and/or refraction. Generally, the means for coupling out light are distributed non-uniformly over the rear wall of the relevant light-emitting panel, i.e. they are provided at a predetermined gradient allowing light to be coupled out of the relevant light-emitting panel as uniformly as possible.

The first light-emitting panel, which is situated closest to the display device, allows passage of light originating from the second light-emitting panel, which is situated on the side of the first light-emitting panel facing away from the display device. In an alternative embodiment, the second light-emitting panel is arranged between the first light-emitting panel and the display device.

It is particularly favorable if the light-transmitting edge areas are alternately situated at opposite sides of the first and the second light-transmitting panel. This enables any influence of the light originating from gradients in the distribution of the means for coupling light out of the light-emitting panel to be compensated since the gradients extend in the same (yet opposite) direction. This can be achieved in a similar manner for three sequentially arranged light-emitting panels.

Preferably, the illumination system comprises control electronics for changing the luminous flux of the light-emitting diodes. Suitable control electronics enables the desired color temperature effects to be achieved. It is particularly favorable if the control electronics can be influenced by the user of the assembly, by means of a sensor that measures, for example, the color temperature of the ambient light, or by means of a video card of, for example, a (personal) computer and/or by means of drive software of a computer program.

In a further preferred embodiment of an illumination system according to the invention the clusters of LEDs are formed as multi-chip package containing the required number of light emitting diodes of the first, second and third emission wavelength and showing mirror symmetry of a imaginary mirror surface. Accordingly a preferably display device is provided with the multi-chip package LED clusters. This has the advantage that mixing of colors already starts inside the chip package, which has an improving effect on the mixing inside the light-emitting panel. Thus both color mixing as well as homogeneity of the light over the emitting panel surface is improved.

These and other aspects of the invention will be apparent from and elucidated with reference to the embodiment(s) described hereinafter.

In the drawings:

FIG. 5C is a side view of a detail of a further alternative embodiment of the illumination system shown in FIG. 1.

The Figures are purely diagrammatic and not drawn to scale. Particularly for clarity, some dimensions are exaggerated strongly. In the Figures, like reference numerals refer to like parts whenever possible.

Figure 1:
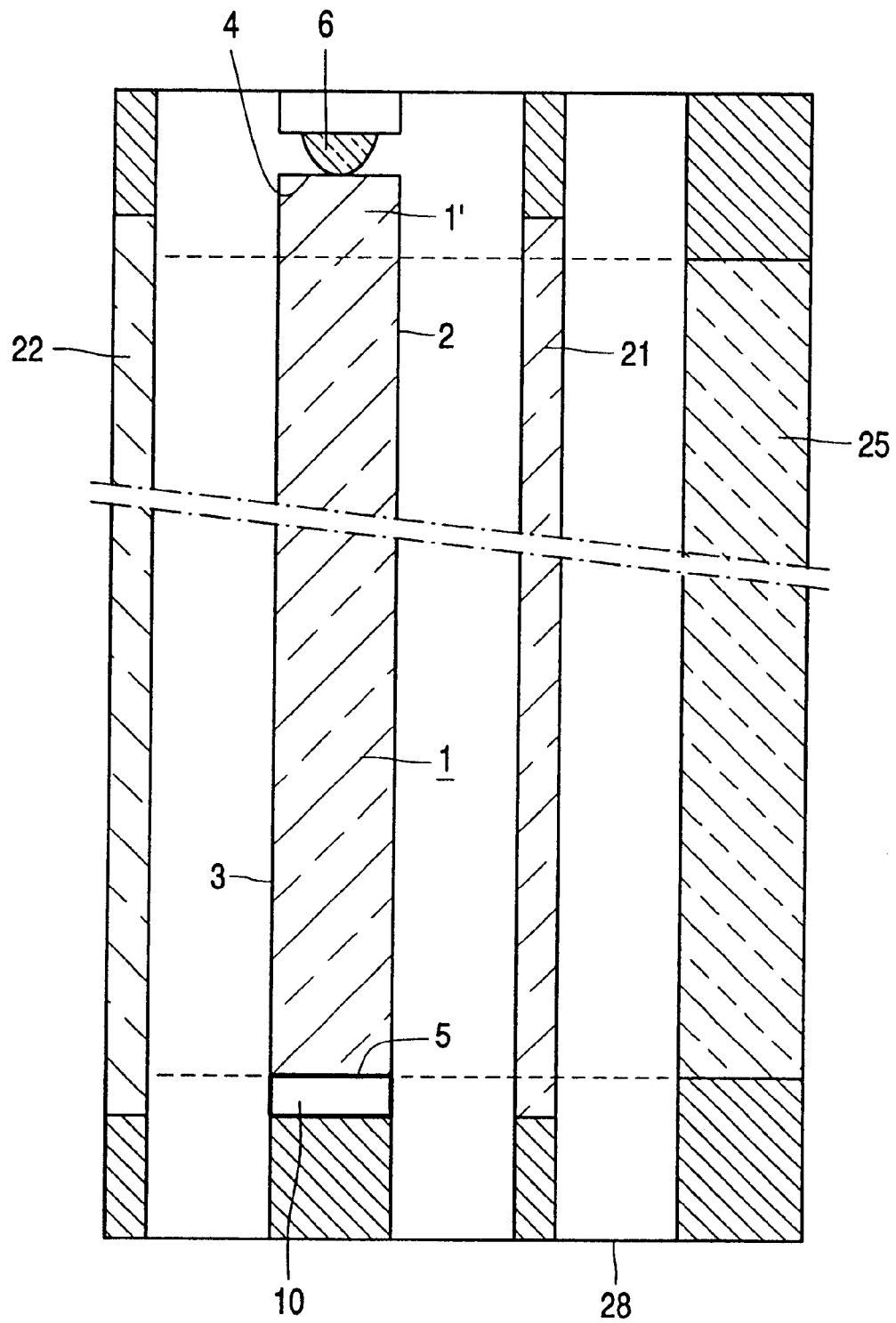
FIG. 1 is a cross-sectional view of a display device comprising an embodiment of the illumination system in accordance with the invention.

FIG. 1 is a cross-sectional view of an embodiment of an illumination system in accordance with the invention. The illumination system comprises a light-emitting panel 1 of a light-transmitting material. The panel 1 is made from, for example, a synthetic resin, acryl, polycarbonate, ppma, such as Perspex, or glass. In operation, light is transported through the panel 1 under the influence of total internal reflection. The panel 1 has a front wall 2 and a rear wall 3 opposite said front wall. Between the front wall 2 and the rear wall 3, there are edge areas 4, 5. In the example shown in FIG. 1, the edge area referenced 4 is light-transmitting, and at least one light source 6 is associated therewith. In operation, light originating from the light source 6 is incident on the light-transmitting edge area 4, 14 and diffuses in the panel 1.

In an alternative embodiment of the illumination system, also the edge area bearing reference numeral 5 is light transmitting, and a further light source is associated therewith.

In accordance with the invention, clusters of LEDs having a first, a second and a third light emission wavelength are associated with the light-transmitting edge area (see FIGS. 2A, 2B and 2C), the LEDs being symmetrically arranged with respect to an imaginary mirror surface that relates to the cluster.

The light-emitting panel 1 emits, in operation, light in the direction of the display device, for example a liquid crystal display (LCD) device 25. For this purpose, the rear wall 3 of the light-emitting panel 1 is provided with means (not shown in FIG. 1) for coupling light out of the light-emitting panel 1. These means comprise (patterns of) deformations and include, for example, screen printed dots, wedges and/or ridges. The means are provided in the rear wall of the panel 1 by means of, for example, printing, pressing, etching, scribing or sandblasting. In an alternative embodiment, the deformations are provided in the front wall of the light-emitting panel. The means couple light out of the light-emitting panel 1 by reflection, scattering and/or refraction. The means for coupling out light are generally non-uniformly distributed over the rear wall of the relevant light-emitting panel, i.e. they are provided at a predetermined gradient allowing light to be coupled out of the relevant illumination system as uniformly as possible.

The means for coupling out light serve as a secondary light source. A specific optical system may be associated with said secondary light source, which optical system is provided, for example, on the rear wall 2 (not shown in FIG. 1). The optical system may be used, for example, to produce a broad light beam.

Figure 2A:
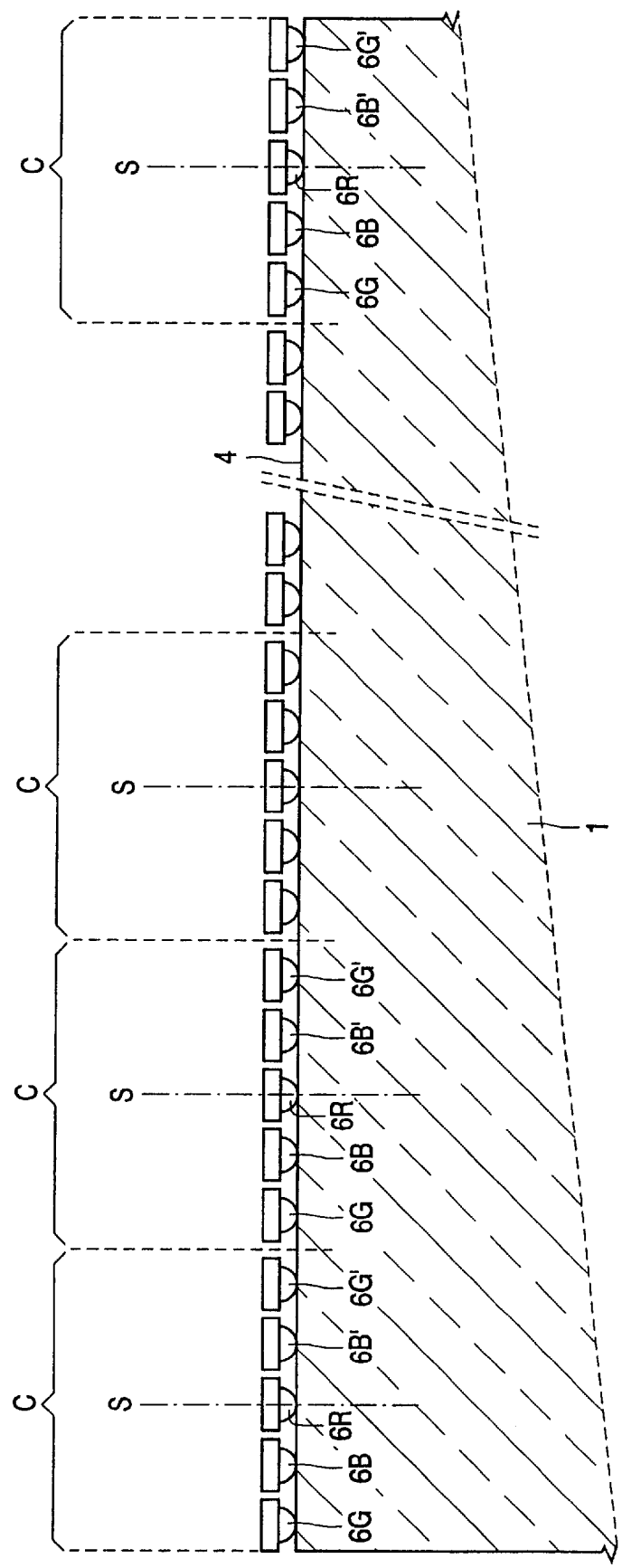
FIG. 2A is a side view of a detail of an embodiment of the illumination system shown in FIG. 1.
Figure 2B:
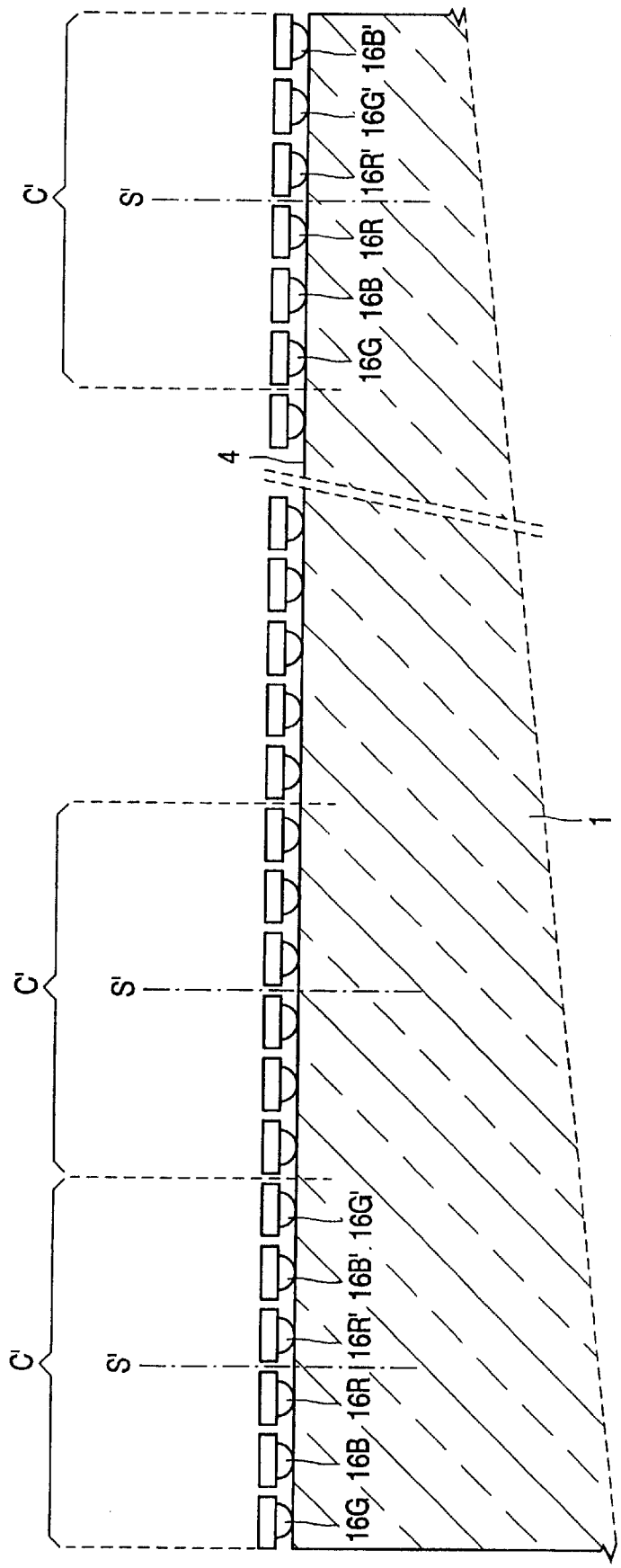
FIG. 2B is a side view of a detail of an alternative embodiment of the illumination system shown in FIG. 1.
Figure 2C:
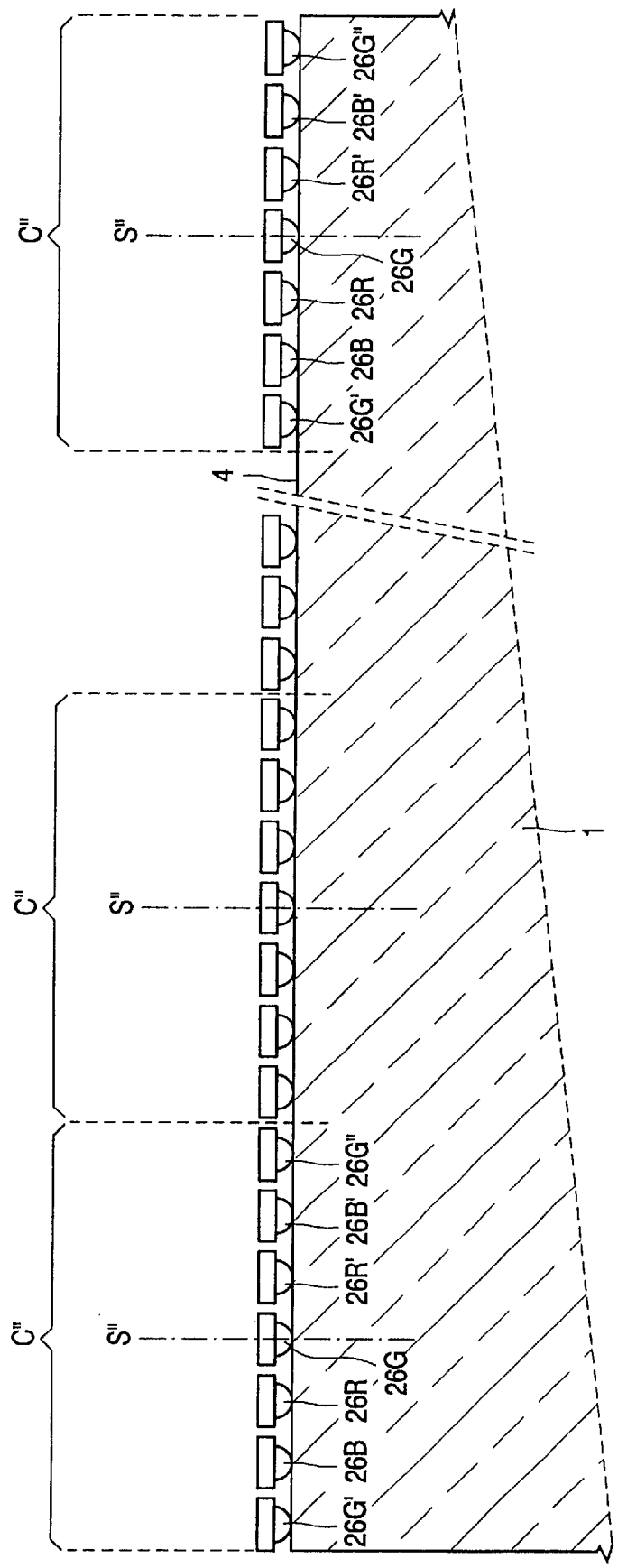
FIG. 2C is a side view of a detail of a further alternative embodiment of the illumination system shown in FIG. 1.

The light source 6 comprises a plurality of light-emitting diodes (LEDs) (also see FIGS. 2A, 2B and 2C). In general, the source brightness of LEDs is many times that of fluorescent tubes. In addition, when use is made of LEDs, the efficiency with which light is coupled into the panel is higher than in the case of fluorescent tubes. The use of LEDs as a light source has the advantage that the LEDs may contact panels made of a synthetic resin material. LEDs hardly emit heat in the direction of the light-emitting panel 1 and do not emit detrimental (UV) radiation. The use of LEDs has the additional advantage that means for coupling light originating from the LEDs into the panel can be dispensed with. The application of LEDs preferably leads to a more compact illumination system.

In FIG. 1, an optional (polarizing) diffuser 21 and a reflecting diffuser 22 are shown, which bring about further mixing of the light originating from the light-emitting panel 1. FIG. 1 further shows, very diagrammatically, a display device, preferably a LCD panel, bearing reference numeral 25. The assembly of the light-emitting panel 1, the light source 6, the diffuser 21, the display device 25 and a housing 28 forms a display device for displaying, for example, (video) images.

In FIG. 1, the light-emitting panel 1 is further provided with a sensor 10 for measuring the optical properties of the light which, in operation, is emitted by the light source 6. This sensor 10 is coupled to control electronics (not shown in FIG. 1) for suitably adapting the luminous flux of the light source 6. By means of the sensor 10 and the control electronics, a feedback mechanism can be formed which is used to influence the quality and the quantity of the light coupled out of the light-emitting panel 1.

In the example shown in FIG. 1, the LEDs contact the light-transmitting edge area 4. The first part of the light-emitting panel 1, referenced 1', is used to mix the light originating from the LEDs.

FIG. 2A is a side view of a detail of an embodiment of the illumination system shown in FIG. 1. In this Figure, the light source associated with the light-transmitting edge area 4 of the light-emitting panel 1 comprises clusters C of five LEDs 6G, 6B, 6R, 6B', 6G'; 6G, 6B, 6R, 6B', 6G'; . . . . Said five LEDs are selected from a group formed by LEDs having a first, a second and a third light emission wavelength, which wavelengths are different. In the example shown in FIG. 2A, the LEDs emit, in operation, red (R), blue (B) and green (G) light. An imaginary mirror surface S, that relates to the cluster, is situated in the middle of each cluster C. The LEDs in the cluster C are arranged in a direction perpendicular to the imaginary mirror surface S. The LEDs are distributed over the cluster C in such a manner that the spectral emissions of the light emitted by the LEDs are mirror symmetrical with respect to the imaginary mirror surface S. In the example shown in FIG. 2A, one LED 6R is situated in the middle of the cluster C. The imaginary mirror surface S is situated in the geometrical center of this LED 6R. Said LED 6R is arranged between two LEDs 6B, 6B'. Each one of said LEDs is flanked, on the side of the cluster C facing away from the mirror surface S, by a LED 6G, 6G'. In this example, the clusters C comprise sequences of GBRBG LEDs. In alternative embodiments, different sequences are employed.

FIG. 2B is a side view of a detail of an alternative embodiment of the illumination system shown in FIG. 1. In this Figure, the light source associated with the light-transmitting edge area 4 of the light-emitting panel 1 comprises clusters C' of six LEDs 16G, 16B, 16R, 16R', 16B', 16G; 16G, 16B, 16R, 16R', 16B', 16G'; . . . . Said six LEDs are selected from a group formed by LEDs having a first, a second and a third light emission wavelength, which wavelengths are different. In the example shown in FIG. 2B, the LEDs emit, in operation, red (R), blue (B) and green (G) light. In the middle of each cluster C', there is an imaginary mirror surface S' that relates to said cluster. The LEDs in the cluster C' are arranged in a direction perpendicular to the imaginary mirror surface S'. The LEDs are distributed over the cluster C' in such a manner that the spectral emissions of the light emitted by the LEDs are mirror symmetrical with respect to the imaginary mirror surface S'. In the example shown in FIG. 2B, two LEDs 16R, 16R' are situated in the middle of the cluster C'. The imaginary mirror surface S' is situated between these two LEDs 16R, 16R'. Said LEDs 16R, 16R' are arranged between two LEDs 16B, 16B'. Each one of the latter two LEDs is flanked, on the side of the cluster C' facing away from the mirror surface S', by a LED 16G, 16G'. In this example, the clusters C' comprise sequences of GBRRBG LEDs. In an alternative embodiment, other sequences are used.

FIG. 2C is a side view of a detail of a further alternative embodiment of the illumination system shown in FIG. 1. In this Figure, the light source associated with the light-transmitting edge area 4 of the light-emitting panel 1 comprises clusters C" of seven LEDs 26G', 26B, 26R, 26G, 26R', 26B, 26G"; 26G', 26B, 26R, 26G, 26R', 26B', 26G"; . . . . Said seven LEDs are selected from a group formed by LEDs having a first, a second and a third light emission wavelength, which wavelengths are different. In the example shown in FIG. 2C, the LEDs emit, in operation, green (G), red (R) and blue (B) light. In the middle of each cluster C", there is an imaginary mirror surface S" that relates to said cluster. The LEDs in the cluster C" are arranged in a direction perpendicular to the imaginary mirror surface S". The LEDs are distributed over the cluster C" in such a manner that the spectral emissions of the light emitted by said LEDs are mirror symmetrical with respect to the imaginary mirror surface S". In the example shown in FIG. 2C, a LED 26G is situated in the middle of the cluster C". The imaginary mirror surface S" is situated in the geometrical center of this LED 26R. Said LED 26R is arranged between two LEDs 26R, 26R'. Each one of these LEDs is flanked, on the side of the cluster C" facing away from the mirror surface S", by a LED 26B, 26B'. Each one of the latter LEDs is flanked, on the side facing away from the mirror surface S", by a LED 26G', 26G". In this example, the clusters C" comprise sequences of GBRGRBG LEDs. In alternative embodiments other sequences are used.

Figure 3A:
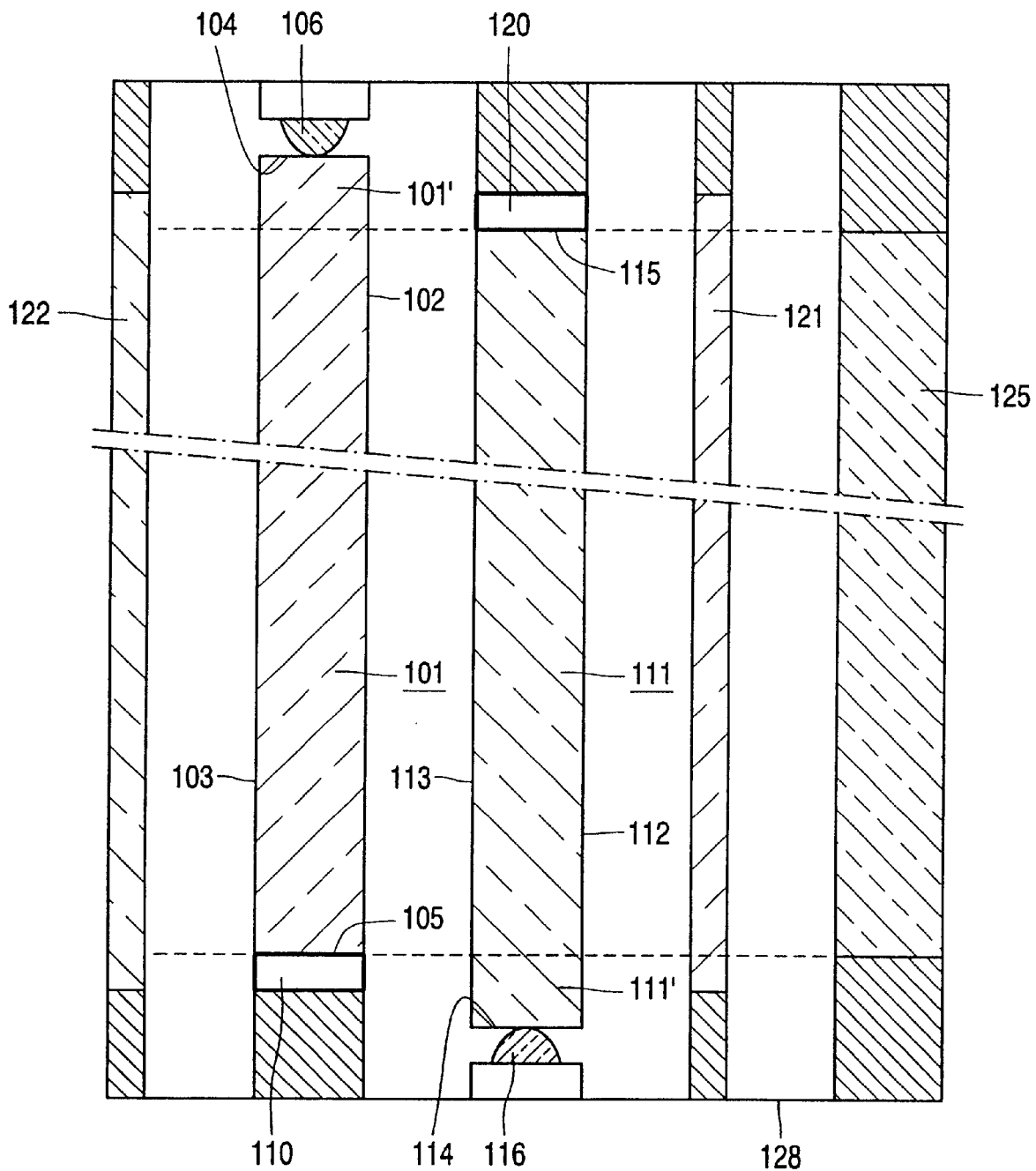
FIG. 3A is a cross-sectional view of a display device comprising an alternative embodiment of the illumination system in accordance with the invention.

FIG. 3A is a cross-sectional view of a display device comprising an alternative embodiment of the illumination system in accordance with the invention. The illumination system comprises a light-emitting panel 101; 111 of a light-transmitting material. In operation, light is transported through the panel 101; 111 under the influence of total internal reflection. The panel 101; 111 has a front wall 102; 112 and a rear wall 103; 113 opposite said front wall. Edge areas 104, 114; 105, 115 are situated between the front wall 102; 112 and the rear wall 103; 113. In the example shown in FIG. 3, the edge area bearing reference numeral 104; 114 is light-transmitting, and at least one light source 106; 116 is associated therewith. In operation, light originating from the light source 106; 116 is incident on the light-transmitting edge area 104; 114 and diffuses in the panel 101; 111.

Figure 3B:
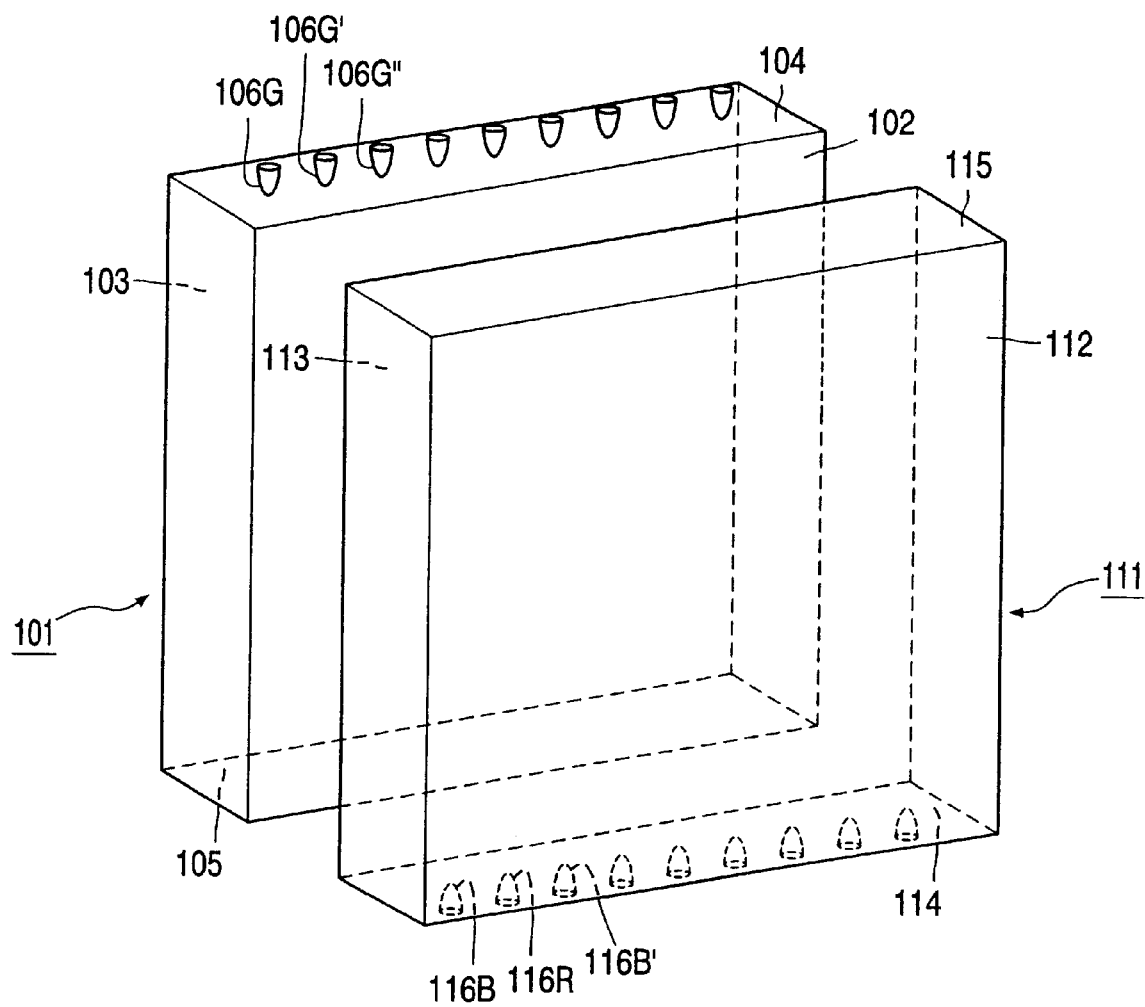
FIG. 3B is a perspective view of a detail of an embodiment of the illumination system shown in FIG. 3A.

In accordance with said alternative embodiment, the illumination system comprises a first light-emitting panel 101 and a second light-emitting panel 111, said panels 101, 111 are arranged in line so as to be at least substantially parallel to each other (also see FIG. 3B). In operation, the light-emitting panels 101, 111 emit light in the direction of the display device, for example a liquid crystal display (LCD) device 125. For this purpose, the rear walls 103, 113 of each of the light-emitting panels 101, 111 are provided with means (not shown in FIG. 3A) for coupling light out of the light-emitting panel 101, 111.

It is to be noted that light originating from the first light-emitting panel propagates through the second light-emitting panel in order to reach the display device. The transmission of the second, and if necessary third, light-emitting panel influences the mixing of the light at the location of the display device. Preferably, the means for coupling out light comprise diffusely transmissive coupling-out members in the light-emitting panels, which coupling-out members are arranged, for example, by surface roughening in the rear wall of the relevant light-emitting panel. Furthermore, preferably, the change of the distribution of said coupling-out members over the light-emitting panels is oppositely directed. In other words, the coupling-out coefficient for determining the degree to which light is coupled out of the relevant light-emitting panel increases in the first light-emitting panel in a certain direction and decreases in the second light-emitting panel in the same direction.

In order to make sure that light is satisfactorily mixed at the location of the display device (for setting the desired color temperature and color rendition of the light), preferably, the gradients of the distributions of the coupling-out members in the light-emitting panels are matched. In general, the coupling-out members in the second light-emitting panel will influence or attenuate the passage of light originating from the first light-emitting panel. This can be compensated by influencing or increasing the light coupled out of the first light-emitting panel in a suitable manner, for example by adapting the distribution and/or density of the coupling-out members in the first light-emitting panel. In general, using an iterative process, the regulation of the light transmission by the light-emitting panels will be improved.

The light-emitting panel referenced 111, that is closest to the display device 125, allows passage of the light originating from the light-emitting panel referenced 101, which is situated on the side of the light-emitting panel 111 facing away from the display device 125. In the example shown in FIG. 3A, the light-transmitting edge areas 104, 114 are situated on opposite sides of the first and the second light-transmitting panel 101, 111. In this manner, any influence of the light originating from gradients in the distribution of the means for coupling light out of the light-emitting panel 101; 111 can be compensated since the gradients extend in the same (yet opposite) direction.

The light source 106; 116 comprises a plurality of light-emitting diodes (LEDs) (see also FIG. 3B).

FIG. 3A shows an optional (polarizing) diffuser 121 and a reflecting diffuser 122, which bring about further mixing of the light originating from the light-emitting panels 101; 111. FIG. 3A also very diagrammatically shows a display device, preferably a LCD panel, which bears reference numeral 125. The assembly of the panels 101, 111, the light source 106, 116, the diffuser 121, the display device 125 and a housing 128 forms a display device for displaying, for example, (video) images.

In FIG. 3A, each light-emitting panel 101, 111 is further provided with a sensor 110, 120 for measuring the optical properties of the light emitted, in operation, by the light source 106, 116. This sensor 110, 120 is coupled to control electronics (not shown in FIG. 3A) for suitably adapting the luminous flux of the light source 106, 116. By means of the sensor 110, 120 and the control electronics, a feedback mechanism can be formed which is used to influence the quality and the quantity of the light coupled out of the light-emitting panel 101, 111.

In the example shown in FIG. 3A, the LEDs contact the light-transmitting edge area 104, 114. The first part of the light-emitting panel 101; 111, referenced 101'; 111', is used to mix the light originating from the LEDs. In an alternative embodiment of the illumination system, light is mixed in a separate light-mixing chamber which is preferably filled with air.

FIG. 3B is a very diagrammatic, perspective view of a detail of an embodiment of the illumination system shown in FIG. 3A. Symmetric clusters of LEDs 106G, 106G', 106G'', . . . ; 116B, 116R, 116B' couple light into the panel 101, 111 via the light-transmitting edge area 104, 114.

In the example shown in FIG. 3B, LEDs having a first light emission wavelength, i.e. green LEDs 106G, 106G', 106G'', are associated with the first light-transmitting panel 101. LEDs having a light emission wavelength which differs from that of the LEDs associated with the first light-transmitting panel 101, i.e. blue and red LEDs 116B, 116R, 116B', are associated with the second ligh-transmitting panel 111. If light is suitably mixed by the light-emitting panels 101; 111, it is achieved that the display device 25 is illuminated with white light. By suitably driving the LEDs, the light level and/or the color temperature of the light incident on the display device 125 can be regulated.

Figure 4A:
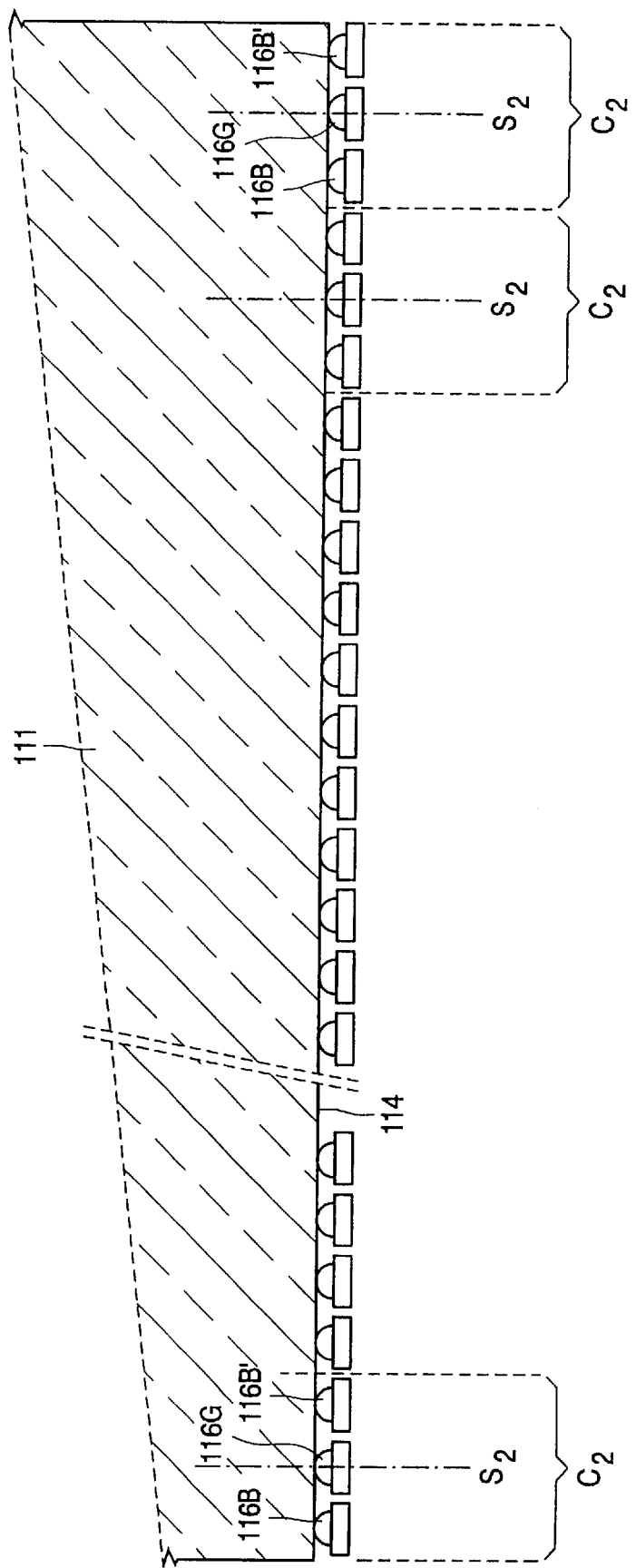
FIG. 4A is a side view of a detail of an embodiment of the illumination system shown in FIG. 3A.

FIG. 4A is a side view of a detail of an embodiment of the illumination system shown in FIG. 3A. In this Figure, the light source associated with the light-transmitting edge area 114 of the second light-emitting panel 111 comprises clusters $C_2$ of three LEDs 116B, 116R, 116B'; 116B, 116R, 116B'; . . . . Said three LEDs are selected from a group formed by LEDs having a second and a third light emission wavelength, which light emission wavelengths are different from each other and from the light emission wavelength of the LEDs associated with the light-transmitting edge area 104 of the first light-emitting panel 101. In the example shown in FIG. 4A, the LEDs associated with the light-transmitting edge area 114 of the second light-emitting panel 111 emit, in operation, red (R) and blue (B) light. In the middle of each cluster $C_2$, there is an imaginary mirror surface $S_2$ that relates to said cluster. The LEDs in the cluster $C_2$ are arranged in a direction perpendicular to the imaginary mirror surface $S_2$. The LEDs are distributed over the cluster $C_2$ in such a manner that the spectral emissions of the light emitted by the LEDs are mirror symmetrical with respect to the imaginary mirror surface $S_2$. In the example shown in FIG. 4A, one LED 116G is situated in the middle of the cluster $C_2$. The imaginary mirror surface $S_2$ is situated in the geometric center of this LED 116G. Said LED 116G is arranged between two LEDs 116B, 116B'. In this example, the clusters $C_2$ comprise sequences of BRB LEDs. In alternative embodiments, different sequences are used.

Figure 4B:
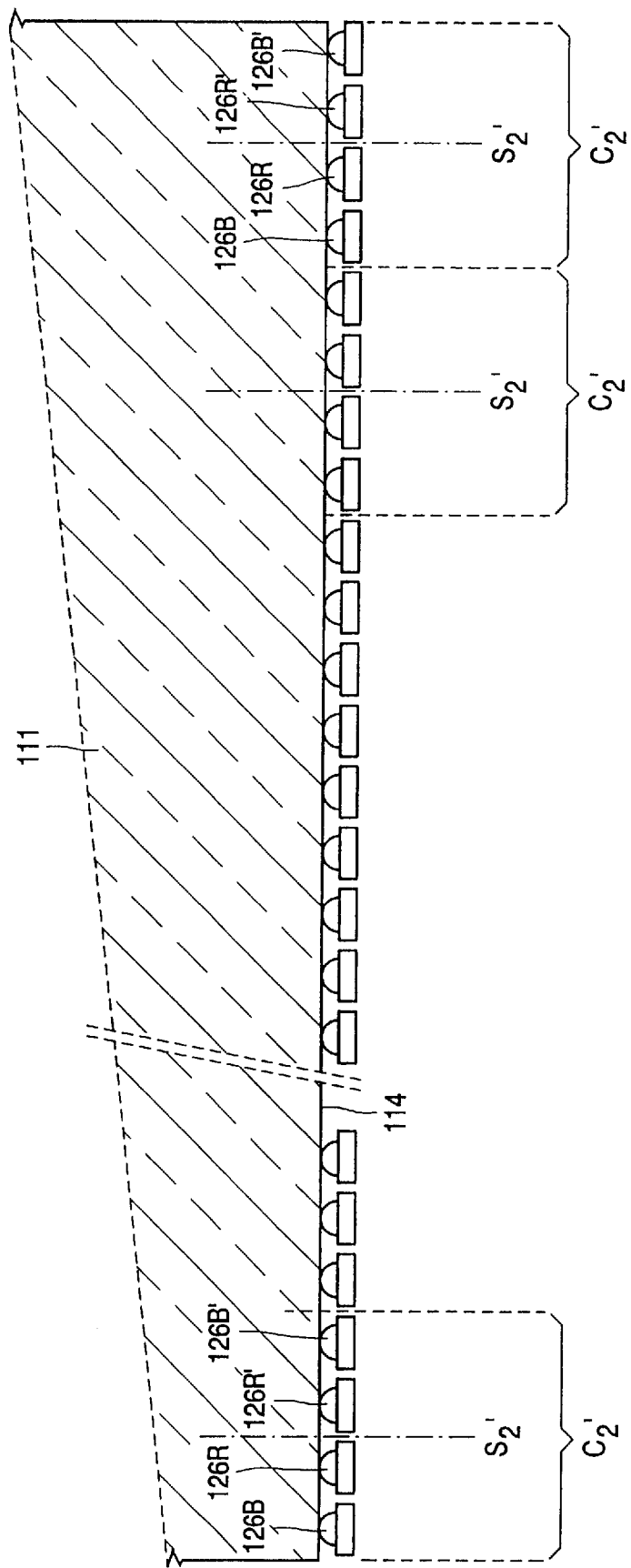
FIG. 4B is a side view of a detail of an alternative embodiment of the illumination system shown in FIG. 3A.

FIG. 4B is a side view of a detail of an alternative embodiment of the illumination system shown in FIG. 3A. In this Figure, the light source associated with the light-transmitting edge area 114 of the second light-emitting panel 111 comprises clusters $C_2'$ of four LEDs 126B, 126R, 126R', 126B'; 126B, 126R, 126R', 126B'; . . . . Said four LEDs are selected from a group formed by LEDs having a second and a third light emission wavelength, which light emission wavelengths differ from each other and from the light emission wavelength of the LEDs associated with the light-transmitting edge area 104 of the first light-emitting panel 101. In the example of FIG. 4B, the LEDs associated with the light-transmitting edge area 114 of the second light-emitting panel 111 emit, in operation, red (R) and blue (B) light. In the middle of each cluster $C_2'$, there is an imaginary mirror surface $S_2'$ that relates to said cluster. The LEDs in the cluster $C_2'$ are arranged in a direction perpendicular to the imaginary mirror surface $S_2'$. The LEDs are distributed over the cluster $C_2'$ in such a manner that the spectral emissions of the light emitted by the LEDs are mirror symmetrical with respect to the imaginary mirror surface $S_2'$. In the example shown in FIG. 4B, two LEDs 126R, 126R' are situated in the middle of the cluster $C_2'$. The imaginary mirror surface $S_2'$ is situated between these LEDs 126R, 126R'. Said LEDs 126R, 126R' are arranged between two LEDs 126B, 126B'. In this example, the clusters $C_2'$ comprise sequences BRRB LEDs. In alternative embodiments, other sequences are used.

Figure 4C:
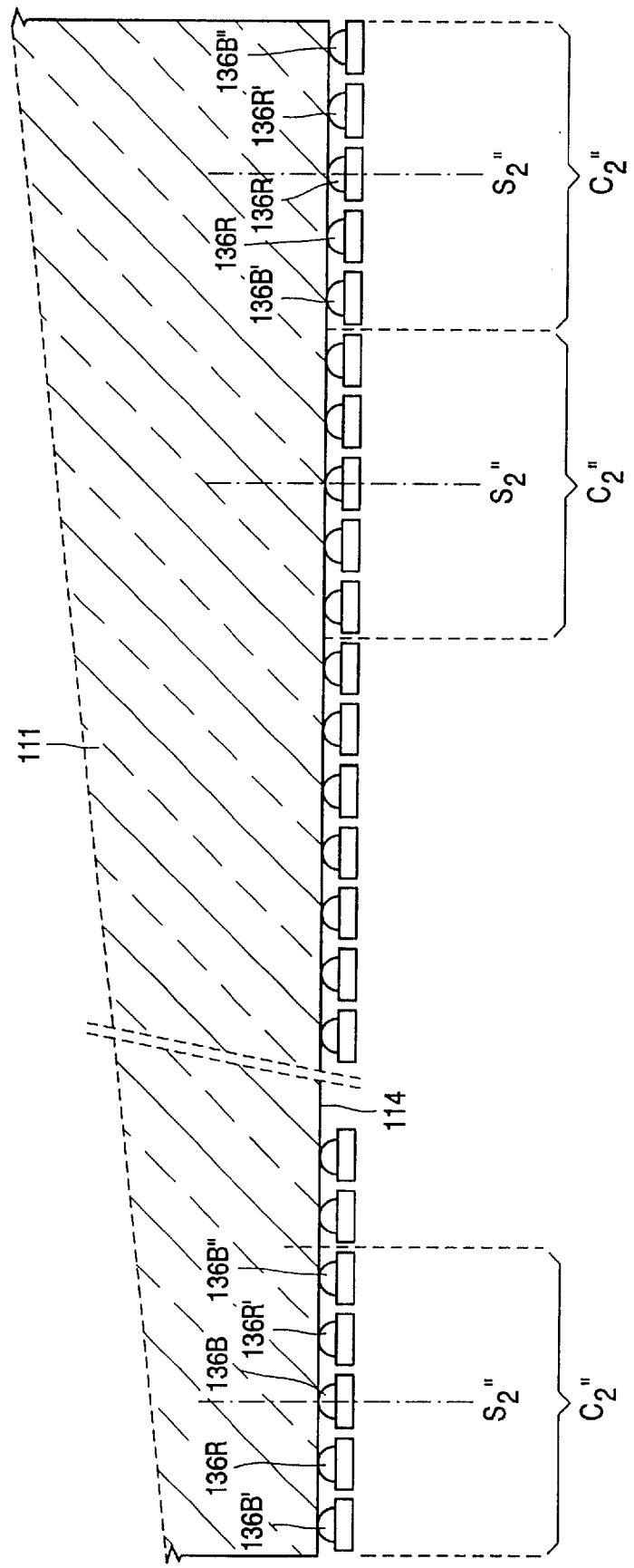
FIG. 4C is a side view of a detail of a further alternative embodiment of the illumination system shown in FIG. 3A.

FIG. 4C is a side view of a detail of an embodiment of the illumination system shown in FIG. 3A. In this figure, the light source associated with the light-transmitting edge area 114 of the second light-emitting panel 111 comprises clusters $C_2"$ of five LEDs 136B', 136R, 136B, 136R', 136B"; 136B', 136R, 136B, 136R', 136B"; . . . . Said five LEDs are selected from a group formed by LEDs having a second and a third light emission wavelength, which light emission wavelengths differ from each other and from the light emission wavelength of the LEDs associated with the light-transmitting edge area 104 of the first light-emitting panel 101. In the example shown in FIG. 4C, the LEDs associated with the light-transmitting edge area 114 of the second light-emitting panel 111 emit, in operation, red (R) and blue (B) light. In the middle of each cluster $C_2"$ there is an imaginary mirror surface $S_2"$ that relates to said cluster. The LEDs in the cluster $C_2"$ are arranged in a direction perpendicular to the imaginary mirror surface $S_2"$. The LEDs are distributed over the cluster $C_2"$ in such a manner that the spectral emissions of the light emitted by the LEDs are mirror symmetrical with respect to the imaginary mirror surface $S_2"$. In the example shown in FIG. 4C, one LED 136B is situated in the middle of the cluster $C_2"$. The imaginary mirror surface $S_2"$ is situated in the geometric center of this LED 136B. Said LED 136B is arranged between two LEDs 136R, 136R'. Each one of these LEDs is flanked, on the side of the cluster $C_2'$ facing away from the mirror surface $S_2"$, by a LED 136B', 136B". In this example, the clusters $C_2"$ comprise sequences of BRBRB LEDs. In alternative embodiments, other sequences are employed, for example clusters of five LEDs with successively RBBBR LEDs.

Figure 4D:
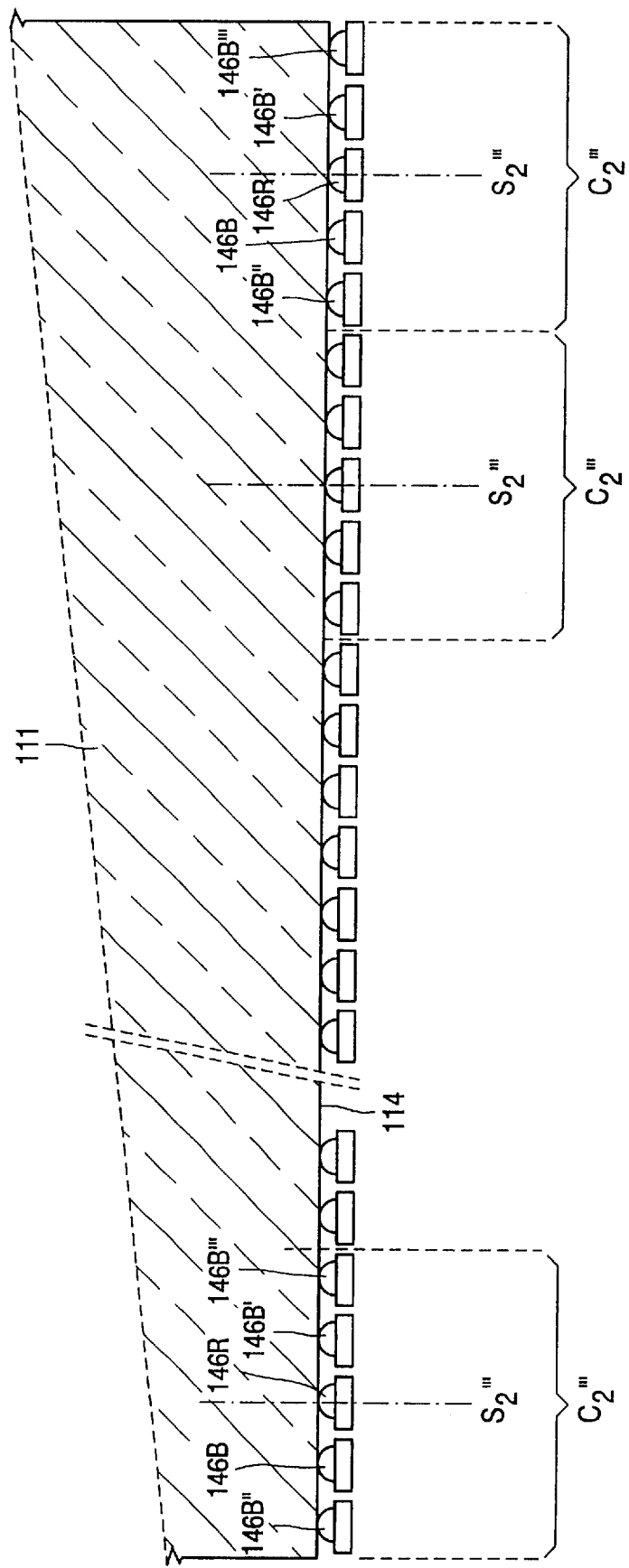
FIG. 4D is a side view of a detail of a further alternative embodiment of the illumination system shown in FIG. 3A.

FIG. 4D is a side view of a detail of an embodiment of the illumination system shown in FIG. 3A. In this Figure, the light source associated with the light-transmitting edge area 114 of the second light-emitting panel 111 comprises clusters $C_2'''$ of five LEDs 146B", 146B, 146R, 146B', 146B'''; 146B", 146B, 146R, 146B', 146B'''; . . . . Said five LEDs are selected from a group formed by LEDs having a second and a third light emission wavelength, which light emission wavelengths differ from each other and from the light emission wavelength of the LEDs associated with the light-transmitting edge area 104 of the first light-emitting panel 101. In the example shown in FIG. 4D, the LEDs associated with the light-transmitting edge area 114 of the second light-emitting panel 111 emit, in operation, red (R) and blue (B) light. In the middle of each cluster $C_2'''$, there is an imaginary mirror surface $S_2'''$ that relates to said cluster. The LEDs in the cluster $C_2'''$ are arranged in a direction perpendicular to the imaginary mirror surface $S_2'''$. The LEDs are distributed over the cluster $C_2'''$ in such a manner that the spectral emissions of the light emitted by the LEDs are mirror symmetrical with respect to the imaginary mirror surface $S_s'''$. In the example shown in FIG. 4D, one LED 146R is situated in the middle of the cluster $C_2'''$. The imaginary mirror surface $S_2'''$ is situated in the geometric center of this LED 146R. Said LED 146R is arranged between two LEDs 146B, 146B'. Each one of these LEDs is flanked, on the side of the cluster $C_2'''$ facing away from the mirror surface $S_2'''$, by a LED 146B", 146B". In this example, the clusters $C_2'''$ comprise sequences of BBRBB LEDs. In alternative embodiments, other sequences are used.

In the embodiment of the illumination system comprising two light-emitting panels 101, 111, as shown in FIG. 3A, it is assumed that the means for coupling out light, alternatively referred to as coupling-out members, are provided throughout the surface area of the rear wall 103 (or front wall 102) (with the exception of the portion of the first part of the light-emitting panel 101; 111, referenced 101';111', which is used to mix light originating from the LEDs). In an alternative embodiment of the illumination system, only a part of the rear wall of each of the light-emitting panels is provided with coupling-out members. The part of the light-emitting panels that is not provided with coupling-out members thus serves as an additional light-mixing chamber to make sure that light is coupled out uniformly and homogeneously. By way of example, in such an embodiment only sub-surfaces of the rear walls of each of the light-emitting panels are provided with means for coupling light out of the panel, each of said sub-surfaces, in operation, coupling out light and projecting it on a portion of the display device in such a manner that the projections of the light on the display device are at least contiguous. In this embodiment, both the first and the second light-emitting panel are provided with symmetric clusters of LEDs of all three light emission wavelengths. In other words, LEDs as shown in the FIGS. 2A–2D, and the alternatives described in relation thereto, are associated with each of the light-emitting panels from which light is coupled out via sub-surfaces.

In an alternative embodiment of the illumination system described in the preceding paragraph, which illumination system comprises two light-emitting panels, said sub-surfaces extend over a substantial part of the rear wall of each of the light-emitting panels, and the means for coupling out light are arranged such that the degree to which light is coupled out changes as a function of the distance to the light-transmitting edge area.

Figure 5A:
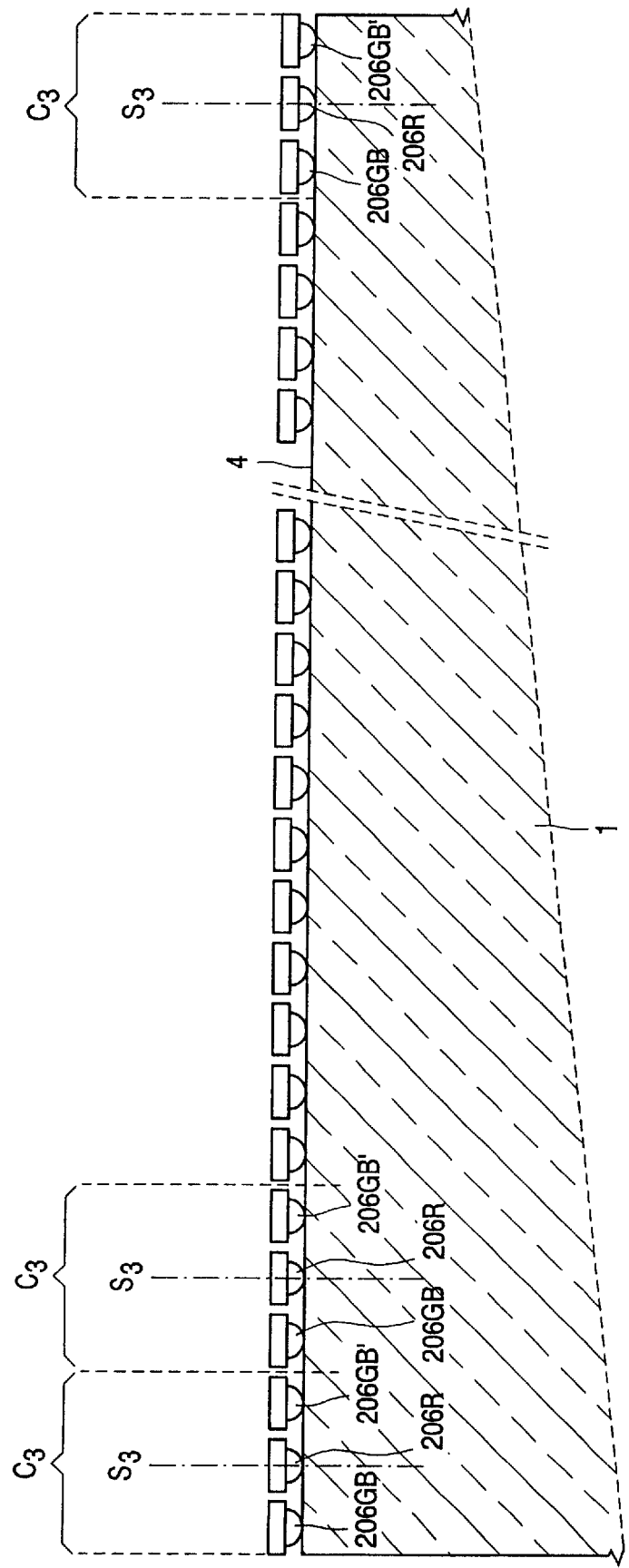
FIG. 5A is a side view of a detail of a further alternative embodiment of the illumination system shown in FIG. 1.

FIG. 5A is a side view of a detail of a further alternative embodiment of the illumination system shown in FIG. 1. In this Figure, the light source associated with the light-transmitting edge area 4 of the light-emitting panel 1 comprises clusters $C_3$ of three LEDs, i.e. one LED 206R having the first light emission wavelength, which is flanked by two LEDs 206GB, 206GB' having a combination of the second and the third light emission wavelength. In the example shown in FIG. 5A, the LEDs having the first light emission wavelength emit, in operation, red (R) light, and the LEDs having the combination of the second and the third light emission wavelength emit, in operation, green (G) and blue (B) light. In the middle of each cluster $C_3$, there is an imaginary mirror surface $S_3$ that relates to said cluster. The LEDs in the cluster $C_3$ are arranged in a direction perpendicular to the imaginary mirror surface $S_3$. The LEDs are distributed over the cluster $C_3$ in such a manner that the spectral emissions of the light emitted by the LEDs are mirror symmetrical with respect to the imaginary mirror surface $S_3$. In the example of FIG. 5A, the imaginary mirror surface $S_3$ is situated in the geometric center of LED 206R. In alternative embodiments, other sequences are used.

Figure 5B:
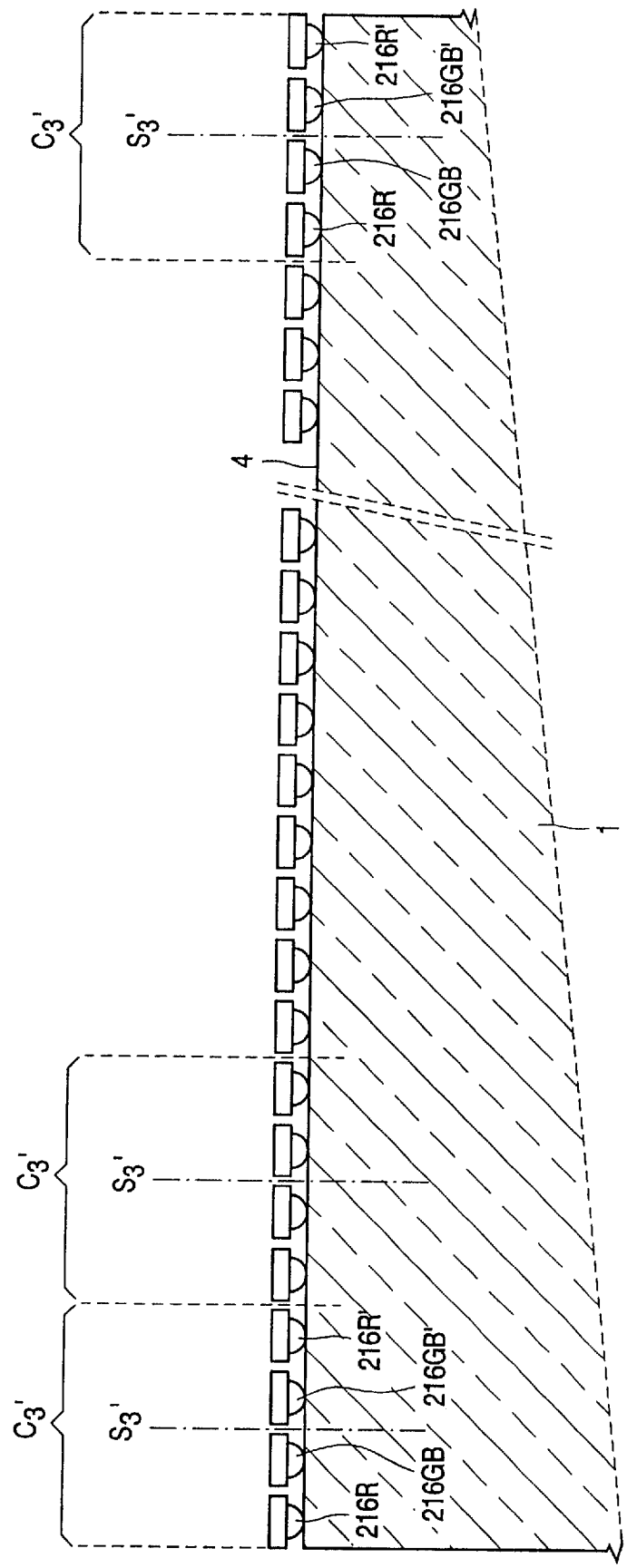
FIG. 5B is a side view of a detail of a further alternative embodiment of the illumination system shown in FIG. 1.

FIG. 5B is a side view of a detail of a further alternative embodiment of the illumination system shown in FIG. 1. In this Figure, the light source associated with the light-transmitting edge area 4 of the light-emitting panel 1 comprises clusters $C_3'$ of four LEDs, i.e. two LEDs 216GB, 216GB' having a combination of the second and the third light emission wavelength, which are flanked by two LEDs 216R, 216R' having the first light emission wavelength. In the example shown in FIG. 5B, the LEDs having the combination of the second and the third light emission wavelength emit, in operation, green (G) and blue (B) light, and the LEDs having the first light emission wavelength emit, in operation, red (R) light. In the middle of each cluster $C_3'$, there is an imaginary mirror surface $S_3'$ that relates to said cluster. The LEDs in the cluster $C_3'$ are arranged in a direction perpendicular to the imaginary mirror surface $S_3'$. The LEDs are distributed over the cluster $C_3'$ in such a manner that the spectral emissions of the light emitted by the LEDs are mirror symmetrical with respect to the imaginary mirror surface $S_3'$. In the example shown in FIG. 5B, the imaginary mirror surface $S_3'$ is situated between the two LEDs 216GB, 216GB'. In alternative embodiments, other sequences are used.

FIG. 5C is a side view of a detail of a further alternative embodiment of the illumination system shown in FIG. 1. In this Figure, the light source associated with the light-transmitting edge area 4 of the light-emitting panel 1 comprises clusters $C_3''$ of five LEDs, i.e. two LEDs 226R, 226R' having the first light emission wavelength and three LEDs 226GB', 226GB, 226GB'' having a combination of the second and the third light emission wavelength. In the example shown in FIG. 5C, the LEDs having the first light emission wavelength emit, in operation, red (R) light, and the LEDs having the combination of the second and the third light emission wavelength emit, in operation, green (G) and blue (B) light. In the middle of each cluster $C_3''$, there is an imaginary mirror surface $S_3''$ that relates to said cluster. The LEDs in the cluster $C_3''$ are arranged in a direction perpendicular to the imaginary mirror surface $S_3''$. The LEDs are distributed over the cluster $C_3''$ in such a manner that the spectral emissions of the light emitted by the LEDs are mirror symmetrical with respect to the imaginary mirror surface $S_3''$. In the example of FIG. 5C, the imaginary mirror surface $S_3''$ is situated in the geometric center of LED 226GB. Said LED 226GB is arranged between two LEDs 226R, 226R'. Each one of said two LEDs is flanked, on the side of the cluster $C_3''$ facing away from the mirror surface $S_3''$, by a LED 226GB', 226GB''. In alternative embodiments, other sequences are used.

The LEDs used in the various embodiments of the illumination system, preferably, are LEDs which each have a luminous flux of at least 5 lm. LEDs having such a high output are alternatively referred to as LED power packages. Examples of power LEDs are "Luxeon™" type LEDs (Lumileds), having a luminous flux per LED of 35 lm for red LEDs, 20 lm for green LEDs, 8 lm for blue LEDs and 40 lm for amber LEDs.

In alternative embodiments use can also be made of yellow, amber, cyan, magenta and/or purple LEDs, which have a comparatively high light output (whether use is made of two spectral light emission wavelengths or not).

In further alternative embodiments use can also be made of red LEDs in combination with blue LEDs, which are provided with a phosphor enabling the latter to emit in two spectral bands, i.e. a blue band and a green band.

Preferably, the LEDs are mounted on a (metal-core) printed circuit board. If power LEDs are mounted on such a (metal-core) printed circuit board (PCB), the heat generated by the LEDs can be readily dissipated by heat conduction via the PCB. In an interesting embodiment of the illumination system, the (metal-core) printed circuit board is in contact with the housing of the display device via a heat-conducting connection.

The LEDs used in the described embodiments are shown each as a single-chip package LED for sake of clarity. In alternative embodiments the clusters of LEDs are formed as multi-chip packages each containing light emitting diodes of the first, second and third emission wavelength and having the mirror symmetry of the imaginary mirror surface.

It will be clear that, within the scope of the invention, many variations are possible to those skilled in the art.

The scope of protection of the invention is not limited to the examples given hereinabove. The invention is embodied in each novel characteristic and each combination of characteristics. Reference numerals in the claims do not limit the scope of protection thereof. The use of the verb "to comprise" and its conjugations does not exclude the presence of elements other than those mentioned in the claims. The use of the article "a" or "an" in front of an element does not exclude the presence of a plurality of such elements.

What is claimed is:

1. An illumination system for illuminating a display device, which illumination system is provided with a light-emitting panel (1) comprising a front wall (2), a rear wall (3) situated opposite said front wall, and edge areas (4, 5) between the front wall (2) and the rear wall (3), at least one of the edge areas (4) of the panel (1) being light-transmitting, at least one light source (6) being associated with the light-transmitting edge area (4), and in operation, light originating from the light source (6) being incident on the light-transmitting edge area (4) and spreading in the panel (1), characterized in that the light source (6) associated with the light-transmitting edge area (4) of the light-emitting panel (1) comprises clusters (C) of at least three light-emitting diodes (6G, 6B, 6R, 6B', 6G'; 16G, 16B, 16R, 16R', 16B', 16G'; 26G'; 26B, 26R, 26G, 26R', 26B', 26G'') having a first, a second and a third light emission wavelength, which light emission wavelengths are different, an imaginary mirror surface (S), which relates to the cluster (C), being situated in the center of each cluster, the light-emitting diodes in the cluster (C) being arranged in a direction perpendicular to the imaginary mirror surface (S), and the light-emitting diodes (6G, 6B, 6R, 6B', 6G'; 16G; 16B; 16R, 16R', 16B', 16G'; 26G', 26B, 26R, 26G, 26R', 26B', 26G'') being distributed over the cluster (C) in such a manner that the spectral emissions of the light emitted by the light-emitting diodes are mirror symmetrical with respect to the imaginary mirror surface (S).

2. An illumination system as claimed in claim 1, characterized in that each one of the clusters (C) comprises five light-emitting diodes (6G, 6B, 6R, 6B', 6G'), one light-emitting diode (6R) having the first light emission wavelength being situated in the center of the cluster (C), said light-emitting diode being arranged between two light-emitting diodes (6B, 6B') having the second light emission wavelength, and each of said two light-emitting diodes being flanked, on the side facing away from the center of the cluster (C), by a light-emitting diode (6G, 6G') having the third light emission wavelength.

3. An illumination system as claimed in claim 1, characterized in that each one of the clusters (C') comprises six light-emitting diodes (16G, 16B, 16R, 16R', 16B', 16G'), two light-emitting diodes (16R, 16R') having the first light emission wavelength being situated in the center of the cluster (C'), said two light-emitting diodes being arranged between two light-emitting diodes (16B, 16B') having the second light emission wavelength, and the latter two light-emitting diodes each being flanked, on the side facing away from the center of the cluster (C'), by a light-emitting diode (16G, 16G') having the third light emission wavelength.

4. An illumination system as claimed in claim 1, characterized in that each one of the clusters (C") comprises seven light-emitting diodes (26G', 26B, 26R, 26G, 26R', 26B', 26G"),
one light-emitting diode (26G) having the first light emission wavelength being situated in the center of the cluster (C"),
said light-emitting diode being arranged between two light-emitting diodes (26R, 26R') having the second light emission wavelength,
said two light-emitting diodes being flanked, on the side facing away from the center of the cluster (C"), by a light-emitting diode (26B, 26B') having the third light emission wavelength, and
the latter light-emitting diodes each being flanked, on the side facing away from the center of the cluster (C"), by a light-emitting diode (26G', 26G") having the first light emission wavelength.

5. An illumination system as claimed in claim 1, characterized in that the light source (6) associated with the light-transmitting edge area (4) of the light-emitting panel (1) comprises symmetric clusters (C, C', C") of blue, green and red light-emitting diodes (6G, 6B, 6R, 6B', 6G'; 16G; 16B, 16R, 16R', 16B', 16G'; 26G', 26B, 26R, 26G, 26R', 26B', 26G").

6. An illumination system as claimed in claim 1, characterized in that two neighboring clusters of light-emitting diodes share a light-emitting diode at the location of an imaginary interface between the clusters.

7. An illumination system as claimed in claim 1, characterized in that each one of the light-emitting diodes (6G; 6B, 6R, 6B', 6G'; 16G; 16B, 16R, 16R', 16B', 16G; 26G', 26B, 26R, 26G, 26R', 26B', 26G"; 106G; 116B, 116R, 116B'; 126B, 126R, 126R', 126B'; 136B', 136R, 136B, 136R', 136B"; 146B", 146B, 146R, 146B', 146B'"; 206GB, 206R, 206GB'; 216R, 216GB, 216GB', 216R'; 226GB', 226R, 226GB, 226R', 226GB") has a luminous flux of at least 5 lm.

8. An illumination system as claimed in claim 1 wherein each cluster of light emitting diodes is formed as a multi-chip package containing light emitting diodes of the first, second and third emission wavelength.

9. A display device provided with an illumination system as claimed in claim 1.

10. A display device as claimed in claim 9, said display device comprising a liquid crystal display (25).

11. A display device as claimed in claim 9, wherein each cluster of light emitting diodes is formed as a multi-chip package containing light emitting diodes of the first, second and third emission wave length.

12. An illumination system for illuminating a display device, which illumination system is provided with a light-emitting panel (101; 111) comprising
a front wall (102; 112) a rear wall (103; 113) opposite said front wall, and edge areas (104, 105; 114, 115) between said front wall (102; 112) and said rear wall (103; 113),
at least one of the edge areas (104; 114) of the panel (101; 111) being light-transmitting,
at least one light source (106; 116) being associated with the light-transmitting edge area (104; 114), and
in operation, light originating from the light source (106; 116) being incident on the light-transmitting edge area (104; 114) and diffusing in the panel (101; 111), characterized in that,
the illumination system comprises a first light-emitting panel (101) and a second light-emitting panel (111), which first and second light-emitting panel (101, 111) are arranged substantially parallel to each other,
the light source (106) associated with the light-transmitting edge area (104) of the first light-emitting panel (101) comprises a plurality of light-emitting diodes (106G, 106G', 106G", ...) having a first light emission wavelength, and
the light source (116) associated with the light-transmitting edge area (114) of the second light-emitting panel (111) comprises clusters ($C_2$) of at least two light-emitting diodes (116B, 116R, 116B', 126B, 126R, 126R', 126B'; 136B', 136R, 136B, 136R, 136B"; 146B", 146B, 146R, 146B', 146B'") having a second and a third light emission wavelength,
an imaginary mirror surface ($S_2$) that relates to the cluster being arranged in the middle of each cluster ($C_2$),
the light-emitting diodes in the cluster ($C_2$) being arranged in a direction perpendicular to the imaginary mirror surface ($S_2$),
the light-emitting diodes (116B, 116R, 116B'; 126B, 126R, 126R', 126B'; 136B', 136R, 136B, 136R, 136B"; 146B", 146B, 146R, 146B', 146B'") being distributed over the cluster ($C_2$) in such a manner that the spectral emissions of the light emitted by the light-emitting diodes are mirror symmetrical with respect to the imaginary mirror surface ($S_2$), and
the first, second and third light emission wavelengths being different.

13. An illumination system as claimed in claim 12, characterized in that each one of the clusters ($C_2$) comprises three light-emitting diodes (116B, 116R, 116B'),
one light-emitting diode (116R) having the second light emission wavelength being situated in the middle of the cluster ($C_2$),
said light-emitting diode being arranged between two light-emitting diodes (116B, 116B') having the third light emission wavelength.

14. An illumination system as claimed in claim 12, characterized in that each one of the clusters ($C_2'$) comprises four light-emitting diodes (126B, 126R, 126R', 126B'),
two light-emitting diodes (126R, 126R') having the second light emission wavelength being situated in the middle of the cluster ($C_2'$),
said two light-emitting diodes being arranged between two light-emitting diodes (126B, 126B') having the third light emission wavelength.

15. An illumination system as claimed in claim 12, characterized in that each one of the clusters ($C_2''$) comprises five light-emitting diodes (136B', 136R, 136B, 136R', 136B"),
one light-emitting diode (136B) having the third light emission wavelength being situated in the middle of the cluster ($C_2''$),
said light-emitting diode being arranged between two light-emitting diodes (136R, 136R') having the second light emission wavelength, and
each one of said two light-emitting diodes being flanked, on the side facing away from the middle of the cluster ($C_2''$), by a light-emitting diode (136B', 136B") having the third light emission wavelength.

16. An illumination system as claimed in claim 12, characterized in that each one of the clusters ($C_2'''$) comprises five light-emitting diodes (146B", 146B, 146R, 146B', 146B'"),
one light-emitting diode (146R) having the second light emission wavelength being situated in the middle of the cluster ($C_2'''$), said light-emitting diode being arranged between two light-emitting diodes (146B, 146B') having the third light emission wavelength, and each one of said two light-emitting diodes being flanked, on the side facing away from the middle of the cluster ($C_2'''$), by a light-emitting diode (146B'', 146B''') having the third light emission wavelength.

17. An illumination system as claimed in claim 12, characterized in that the light source (106) associated with the light-transmitting edge area (104) of the first light-emitting panel (101) comprises a plurality of green light-emitting diodes (106G), and the light source (116) associated with the light-transmitting edge area (114) of the second light-emitting panel (111) comprises symmetric clusters ($C_2$, $C_2'$, $C_2''$, $C_2'''$) of blue and red light-emitting diodes (116B, 116R, 116B'; 126B, 126R, 126R', 126B'; 136B', 136R, 136B, 136R', 136B''; 146B'', 146B, 146R, 146B', 146B''').

18. An illumination system as claimed in claim 12, characterized in that the light source (106) associated with the light-transmitting edge area (104) of the first light-emitting panel (101) comprises a plurality of red light-emitting diodes, and the light source (116) associated with the light-transmitting edge area (114) of the second light-emitting panel (111) comprises symmetric clusters of blue and green light-emitting diodes.

19. An illumination system as claimed in claim 12, characterized in that the light source (106) associated with the light-transmitting edge area (104) of the first light-emitting panel (101) comprises a plurality of blue light-emitting diodes, and the light source (116) associated with the light-transmitting edge area (114) of the second light-emitting panel (111) comprises symmetric clusters of red and green light-emitting diodes.

20. An illumination system for illuminating a display device, which illumination system is provided with a light-emitting panel (1) comprising a front wall (2), a rear wall (3) opposite said front wall, and edge areas (4, 5) between said front wall (2) and said rear wall (3), at least one of the edge areas (4) of the panel (1) being light-transmitting, at least one light source (6) being associated with the light-transmitting edge area (4), and in operation, light originating from the light source (6) being incident on the light-transmitting edge area (4) and diffusing in the panel (1), characterized in that, the light source (6) associated with the light-transmitting edge area (4) of the light-emitting panel (1) comprises clusters ($C_3$) of at least one light-emitting diode (206R; 216R, 216R'; 226R, 226R''') having a first light emission wavelength and at least one light-emitting diode (206GB, 206GB'; 216GB, 216GB'; 226GB', 226GB, 226GB'') having a combination of a second and a third light emission wavelength, which light emission wavelengths are different, an imaginary mirror surface ($S_3$) that relates to the cluster ($C_3$) being situated in the middle of each cluster, the light-emitting diodes in the cluster ($C_3$) being arranged in a direction perpendicular to the imaginary mirror surface ($S_3$), and the light-emitting diodes (206GB, 206R, 206GB'; 216R, 216GB, 216GB', 216R'; 226GB', 226R, 226GB, 226R', 226GB'') being distributed over the cluster ($C_3$) in such a manner that the spectral emissions of the light emitted by the light-emitting diodes are mirror symmetrical with respect to the imaginary mirror surface ($S_3$).

21. An illumination system as claimed in claim 20, characterized in that each one of the clusters ($C_3$) comprises three light-emitting diodes (206GB, 206R, 206GB'), one light-emitting diode (206R) having the first light emission wavelength being situated in the middle of the cluster ($C_3$), said light-emitting diode being arranged between two light-emitting diodes (206B, 206B') having the combination of the second and the third light emission wavelength.

22. An illumination system as claimed in claim 20, characterized in that each one of the clusters ($C_3'$) comprises four light-emitting diodes (216R, 216GB, 216GB', 216R'), two light-emitting diodes (216GB, 216GB') having the combination of the first and the second light emission wavelength being situated in the middle of the cluster ($C_3'$), said two light-emitting diodes being arranged between two light-emitting diodes (216R, 216R') having the third light emission wavelength.

23. An illumination system as claimed in claim 20, characterized in that each one of the clusters ($C_3''$) comprises five light-emitting diodes (226GB' 226R, 226GB, 226R', 226GB''), one light-emitting diode (226GB) having the combination of the first and the second light emission wavelength being situated in the middle of the cluster ($C_3''$), said light-emitting diode being arranged between two light-emitting diodes (226R, 226R') having the third light emission wavelength, and said two light-emitting diodes each being flanked, on the side facing away from the middle of the cluster ($C_3''$), by a light-emitting diode (226GB', 226GB''') having the combination of the first and the second light emission wavelength.

* * * * *